(12) United States Patent
Han et al.

(10) Patent No.: US 11,265,755 B2
(45) Date of Patent: Mar. 1, 2022

(54) COMMUNICATION METHODS, APPARATUSES, AND SYSTEMS FOR MANAGING QUALITY OF SERVICE FLOWS

(71) Applicant: HUAWEI TECHNOLOGIES CO., LTD., Guangdong (CN)

(72) Inventors: Feng Han, Shanghai (CN); Yinghao Jin, Shanghai (CN); Wei Tan, Shanghai (CN); Hao Bi, Rolling Meadows, IL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/934,490

(22) Filed: Jul. 21, 2020

(65) Prior Publication Data
US 2020/0351700 A1 Nov. 5, 2020

Related U.S. Application Data

(63) Continuation of application No. PCT/CN2019/072350, filed on Jan. 18, 2019.

(30) Foreign Application Priority Data

Jan. 22, 2018 (CN) .......................... 201810060694.6

(51) Int. Cl.
*H04W 28/02* (2009.01)
*H04W 76/27* (2018.01)
(Continued)

(52) U.S. Cl.
CPC ... *H04W 28/0263* (2013.01); *H04W 28/0268* (2013.01); *H04W 76/27* (2018.02);
(Continued)

(58) Field of Classification Search
CPC ............. H04W 28/0263; H04W 76/27; H04W 28/0268; H04W 80/02; H04W 80/08;
(Continued)

(56) References Cited

U.S. PATENT DOCUMENTS

| 2018/0014223 A1* | 1/2018 | Cheng ..................... H04L 69/22 |
| 2020/0107218 A1* | 4/2020 | Wang ..................... H04W 80/02 |
| 2020/0128431 A1* | 4/2020 | Jo ..................... H04W 28/0263 |

FOREIGN PATENT DOCUMENTS

| CN | 104468352 A | 3/2015 |
| CN | 107439037 A | 12/2017 |
| WO | 2017174550 A1 | 10/2017 |

OTHER PUBLICATIONS

Ericsson, "QoS Flow Relocation in NR-DC between MN and SN", 3GPP TSG-RAN WG2 Meeting #99bis, R2-1711238, Prague, Czech Republic, Oct. 9-13, 2017, 6 pages.
(Continued)

*Primary Examiner* — Afshawn M Towfighi
(74) *Attorney, Agent, or Firm* — Fish & Richardson P.C.

(57) ABSTRACT

This application provides a communication method, an apparatus, and a system, to improve communication efficiency. One method includes: sending, by an access network node to a terminal device, indication information indicating to transmit a quality of service (QoS) flow by using a bearer, wherein a protocol stack corresponding to the bearer supports transmission of the QoS flow through a first path, wherein the first path passes through one of (1) a service data adaptation protocol (SDAP) layer of a master node and a protocol layer below an SDAP layer of a secondary node, or (2) an SDAP layer of the secondary node and a protocol layer below an SDAP layer of the master node; and transmitting, by the access network node, the QoS flow by using the first bearer.

20 Claims, 13 Drawing Sheets

(51) Int. Cl.
    *H04W 80/02*     (2009.01)
    *H04W 80/08*     (2009.01)
    *H04W 84/18*     (2009.01)

(52) U.S. Cl.
    CPC ........... *H04W 80/02* (2013.01); *H04W 80/08* (2013.01); *H04W 84/18* (2013.01)

(58) Field of Classification Search
    CPC ..... H04W 84/18; H04W 28/10; H04W 88/06; H04W 28/08; H04W 28/02; H04W 28/24; H04W 72/08; H04W 72/087; H04W 80/00
    See application file for complete search history.

(56) References Cited

OTHER PUBLICATIONS

Ericsson,"TP for 37.340 Introducing bearer harmonization",3GPP TSG-RAN WG3 Meeting #98,Tdoc R3-174745,Reno, Nevada, USA, Nov. 27-Dec. 1, 2017, 46 pages.

Huawei et al.,"Flow based QoS framework for E-UTRA connected to 5GC",3GPP TSG-RAN WG2 Meeting #99, R2-1708400, Berlin, Germany, Aug. 21-25, 2017, 6 pages.

Office Action issued in Chinese Application No. 201810060694.6 dated Apr. 21, 2020, 9 pages (With English Translation).

PCT International Search Report and Written Opinion in International Application No. PCT/CN2019/072,350, dated Apr. 17, 2019, 14 pages (With English Translation).

\* cited by examiner

COMMUNICATION METHODS, APPARATUSES, AND SYSTEMS FOR MANAGING QUALITY OF SERVICE FLOWS

CROSS-REFERENCE TO RELATED APPLICATIONS

This application is a continuation of International Application No. PCT/CN2019/072350, filed on Jan. 18, 2019, which claims priority to Chinese Patent Application No. 201810060694.6, filed on Jan. 22, 2018. The disclosures of the aforementioned applications are hereby incorporated by reference in their entireties.

TECHNICAL FIELD

This application relates to the communications field, and more specifically, to a communication method, an apparatus, and a system.

BACKGROUND

In a long term evolution system (long term evolution, LTE) dual connectivity scenario, there are a plurality of types of bearers, for example, a master cell group (master cell group, MCG) bearer, an MCG split (split) bearer, a secondary cell group (secondary cell group, SCG) bearer, and an SCG split bearer. Transmission paths supported by protocol stacks corresponding to different bearers are different. For example, a data packet mapped to an MCG bearer is transmitted through a path of a primary base station. A data packet mapped to an MCG split bearer, configured by a base station, may be transmitted through a path of a primary base station, or transmitted through a path of a secondary base station, or transmitted through both a path of a primary base station and a path of a secondary base station. An existing solution supports a bearer granularity-based path selection mechanism.

With comprehensive development and gradual deepening of researches on a next generation communications system, 5G defines a quality of service (quality of service, QoS) flow (flow)-based framework. Therefore, how to manage data transmission in a dual connectivity scenario based on a QoS flow framework and improve data transmission quality is an urgent problem to be resolved in the industry.

SUMMARY

This application provides a communication method, an apparatus, and a system, to improve communication efficiency.

According to a first aspect, a communication method is provided. The method includes: sending, by a node, first indication information to a terminal device, where the first indication information is used to indicate to transmit a first QoS flow by using a first bearer, the node is a master node or a secondary node, and a protocol stack corresponding to the first bearer supports transmission of the QoS flow through a first path, where the first path passes through an SDAP (service data adaptation protocol, SDAP) layer of the master node and a protocol layer below an SDAP layer of the secondary node, or the first path passes through an SDAP layer of the secondary node and a protocol layer below an SDAP layer of the master node; and transmitting, by the node, the first QoS flow by using the first bearer.

In this embodiment of this application, the QoS flow may be transmitted by using the SDAP layer of the master node and the protocol layer below the SDAP layer of the secondary node, or may be transmitted by using the SDAP layer of the secondary node and the protocol layer below the SDAP layer of the master node, so that flexibility of transmitting the QoS flow through a transmission path is improved, thereby improving communication efficiency.

In a possible implementation, the protocol stack corresponding to the first bearer further supports transmission of a QoS flow through a second path, where the first path passes through the SDAP layer of the master node and the protocol layer below the SDAP layer of the secondary node, and the second path is a path between the master node and the terminal device; or the first path passes through the SDAP layer of the secondary node and the protocol layer below the SDAP layer of the master node, and the second path is a path between the secondary node and the terminal device.

In a possible implementation, the method further includes: sending, by the node, path indication information to the terminal device, where the path indication information is used to indicate a path transmission mode of the first QoS flow, and the path transmission mode is separately transmitting the first QoS flow through the first path, separately transmitting the first QoS flow through the second path, or transmitting the first QoS flow through both the first path and the second path.

In this embodiment of this application, based on configuration of a radio access network, the QoS flow may be transmitted between the terminal device and the node through one path, or the QoS flow may be transmitted through two paths. This not only implements QoS flow level-based centralized control and management of the radio access network, but also improves flexibility of a communications system.

In a possible implementation, the node sends path adjustment information to the terminal device, where the path adjustment information is used to indicate to change the path transmission mode of the first QoS flow.

In this embodiment of this application, the path transmission mode of the QoS flow can be dynamically adjusted by sending the path adjustment information, thereby improving QoS flow-based transmission efficiency.

In a possible implementation, the path indication information is carried in any one of the following: radio resource control (radio resource control, RRC) layer signaling, SDAP layer signaling, and media access control (media access control, MAC) layer signaling.

In a possible implementation, the method further includes: sending, by the node, configuration indication information to the terminal device, where the configuration indication information is used to indicate the terminal device to: when a first preset condition is met, separately transmit the first QoS flow through the first path; or when a second preset condition is met, separately transmit the first QoS flow through the second path; or when a third preset condition is met, t the first QoS flow through both the first path and the second path.

In this embodiment of this application, the path transmission mode used by the QoS flow is indicated in a pre-configuration manner, and the terminal device may select the path transmission mode of the QoS flow based on the preset condition indicated in the configuration indication information, thereby improving QoS flow-based transmission efficiency.

In a possible implementation, the node sends duplicate transmission indication information to the terminal device, where the duplicate transmission indication information is used to indicate to perform duplicate transmission of the QoS flow mapped to the first bearer through the first path and the second path.

In this embodiment of this application, the duplicate transmission indication information is sent, so that a duplicate transmission mode of the QoS flow can be flexibly configured, thereby improving QoS flow-based transmission efficiency.

In a possible implementation, the method further includes: sending, by the node, duplicate transmission stop indication information to the terminal device, where the duplicate transmission stop indication information is used to indicate to stop duplicate transmission of the QoS flow mapped to the first bearer through the first path and the second path.

In a possible implementation, a frame header of an SDAP protocol data unit (protocol data unit, PDU) included in the first QoS flow includes a serial number, and the serial number is used to indicate a rank of the SDAP PDU.

In this embodiment of this application, the serial number is set in the frame header of the SDAP PDU included in the first QoS flow, to identify data packets transmitted on different paths, thereby improving QoS flow-based communication transmission efficiency.

In a possible implementation, that the first path passes through the SDAP layer of the master node and the protocol layer below the SDAP layer of the secondary node includes: the first path passes through the SDAP layer of the master node, a packet data convergence protocol (packet data convergence protocol, PDCP) layer of the secondary node, and a protocol layer below the PDCP layer of the secondary node; or that the first path passes through the SDAP layer of the secondary node and the protocol layer below the SDAP layer of the master node includes: the first path passes through the SDAP layer of the secondary node, a PDCP layer of the master node, and a protocol layer below the PDCP layer of the master node.

According to a second aspect, a communication method is provided. The method includes: receiving, by a terminal device, first indication information, where the first indication information is used to indicate to transmit a first QoS flow by using a first bearer, and a protocol stack corresponding to the first bearer supports transmission of a QoS flow through a first path, where the first path passes through a SDAP layer of a master node and a protocol layer below an SDAP layer of a secondary node, or the first path passes through an SDAP layer of the secondary node and a protocol layer below an SDAP layer of the master node; and transmitting, by the terminal device, the first QoS flow by using the first bearer.

In this embodiment of this application, the QoS flow may be transmitted by using the SDAP layer of the master node and the protocol layer below the SDAP layer of the secondary node, or may be transmitted by using the SDAP layer of the secondary node and the protocol layer below the SDAP layer of the master node, so that flexibility of transmitting the QoS flow through a transmission path is improved, thereby improving communication efficiency.

In a possible implementation, the protocol stack corresponding to the first bearer further supports transmission of a QoS flow through a second path, where the first path passes through the SDAP layer of the master node and the protocol layer below the SDAP layer of the secondary node, and the second path is a path between the master node and the terminal device; or the first path passes through the SDAP layer of the secondary node and the protocol layer below the SDAP layer of the master node, and the second path is a path between the secondary node and the terminal device.

In a possible implementation, the method further includes: receiving, by the terminal device, path indication information, where the path indication information is used to indicate a path transmission mode of the first QoS flow, and the path transmission mode is separately transmitting the first QoS flow through the first path, separately transmitting the first QoS flow through the second path, or transmitting the first QoS flow through both the first path and the second path.

In a possible implementation, the method further includes: receiving, by the terminal device, path adjustment information, where the path adjustment information is used to indicate to change the path transmission mode of the first QoS flow.

In a possible implementation, the path indication information is carried in any one of the following: RRC layer signaling, SDAP layer signaling, and MAC layer signaling.

In a possible implementation, the method further includes: receiving, by the terminal device, configuration indication information, where the configuration indication information is used to indicate the terminal device to: when a first preset condition is met, separately transmit the first QoS flow through the first path; or When a second preset condition is met, separately transmit the first QoS flow through the second path; or when a third preset condition is met, transmit the first QoS flow through both the first path and the second path.

In a possible implementation, the method further includes: receiving, by the terminal device, duplicate transmission indication information, where the duplicate transmission indication information is used to indicate to perform duplicate transmission of the QoS flow mapped to the first bearer through the first path and the second path.

In a possible implementation, the method further includes: receiving, by the terminal device, duplicate transmission stop indication information, where the duplicate transmission stop indication information is used to indicate to stop duplicate transmission of the QoS flow mapped to the first bearer through the first path and the second path.

In a possible implementation, a frame header of an SDAP protocol data t PDU included in the first QoS flow includes a serial number, and the serial number is used to indicate a rank of the SDAP PDU.

In a possible implementation, that the first path passes through the SDAP layer of the master node and the protocol layer below the SDAP layer of the secondary node includes: the first path passes through the SDAP layer of the master node and a packet data convergence protocol PDCP layer and a protocol layer below a PDCP layer of the secondary node; or that the first path passes through the SDAP layer of the secondary node and the protocol layer below the SDAP layer of the master node includes: the first path passes through the SDAP layer of the secondary node, a PDCP layer of the master node, and a protocol layer below the PDCP layer.

According to a third aspect, a node is provided. The node is configured to perform the method according to any one of the first aspect or the possible implementations of the first aspect. Specifically, the node includes a unit configured to perform the method according to any one of the foregoing first aspect or the possible implementations of the first aspect.

According to a fourth aspect, a terminal device is provided. The terminal device is configured to perform the method according to any one of the second aspect or the possible implementations of the second aspect. Specifically, the terminal device includes a unit configured to perform the method according to any one of the foregoing second aspect or the possible implementations of the second aspect.

According to a fifth aspect, a node is provided. The node includes a communications interface, a memory, and a processor. The memory is configured to store an instruction, the processor is configured to execute the instruction stored in the memory, to control the communications interface to receive a signal and/or send a signal, and when the processor executes the instruction stored in the memory, the execution enables the processor to perform the method according to any one of the first aspect or the possible implementations of the first aspect.

According to a sixth aspect, a terminal device is provided. The terminal device includes a communications interface, a memory, and a processor. The memory is configured to store an instruction, the processor is configured to execute the instruction stored in the memory, to control the communications interface to receive a signal and/or send a signal, and when the processor executes the instruction stored in the memory, the execution enables the processor to perform the method according to any one of the second aspect or the possible implementations of the second aspect.

According to a seventh aspect, a communications system is provided. The communications system includes the node according to the third aspect and the terminal device according to the fourth aspect, or the communications system includes the node according to the fifth aspect and the terminal device according to the sixth aspect.

According to an eighth aspect, a computer-readable medium is provided, and is configured to store a computer program. The computer program includes an instruction used to perform the method according to any one of the first aspect or the possible implementations of the first aspect.

According to a ninth aspect, a computer-readable medium is provided, and is configured to store a computer program. The computer program includes an instruction used to perform the method according to any one of the second aspect or the possible implementations of the second aspect.

According to a tenth aspect, a chip is provided, and is configured to store an instruction. When the chip is run on a node, the chip is enabled to perform the method according to any one of the first aspect or the possible implementations of the first aspect.

According to an eleventh aspect, a chip is provided. When the chip is run on a terminal device, the chip is enabled to perform the method according to any one of the second aspect or the possible implementations of the second aspect.

DESCRIPTION OF EMBODIMENTS

Figure 1:
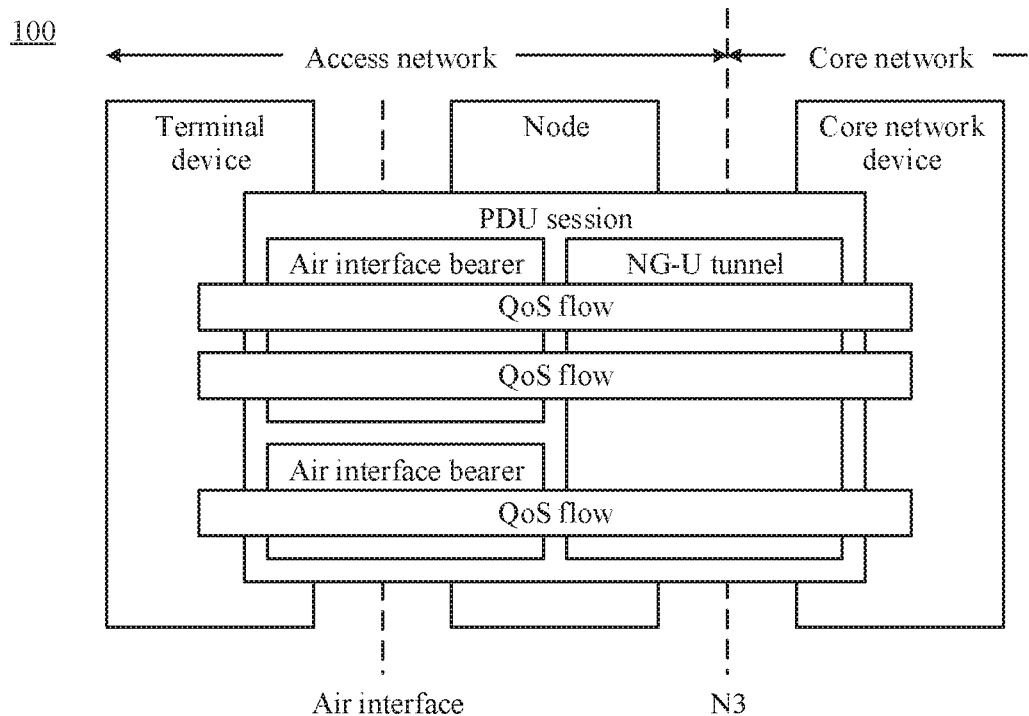
FIG. 1 is a schematic diagram of a network architecture according to an embodiment of this application.

The following describes technical solutions of this application with reference to accompanying drawings.

The technical solutions of the embodiments of this application may be applied to various communications systems, for example, a global system for mobile communications (global system of mobile communication, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LIE time division duplex (time division duplex, TDD), a universal mobile telecommunications system (universal mobile telecommunication system, UMTS), a worldwide interoperability for microwave access (worldwide interoperability for microwave access, WiMAX) communications system, a future 5th generation (5th generation, 5G) system, or a new radio (new radio, NR) system.

A terminal device in the embodiments of this application may also be referred to as user equipment, an access terminal, a subscriber unit, a subscriber station, a mobile station, a mobile station, a remote station, a remote terminal, a mobile device, a user terminal, a terminal, a wireless communication device, a user agent, a user apparatus, or the like. Alternatively, the terminal device may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

A node (for example, a master node or a secondary node) in the embodiments of this application may be a device configured to communicate with the terminal device. The node may be a base transceiver station (base transceiver station, BTS) in the global system for mobile communications (global system of mobile communication, GSM) or the code division multiple access (code division multiple access, CDMA) system, or may be a NodeB (NodeB, NB) in the wideband code division multiple access (wideband code division multiple access, WCDMA) system, or may be an evolved. NodeB (evolutional NodeB, eNB or eNodeB) in the LTE system, or may be a radio controller in a cloud radio access network (cloud radio access network, CRAN) scenario. Alternatively, the node may be a relay node, an access point, a vehicle-mounted device, a wearable device, a base station in a future 5G network, a node in a future evolved PLMN network, or the like, for example, a new radio (new radio, NR) node. This is not limited in the embodiments of this application.

As described above, 5G supports various types of network deployments and application types. To meet the above requirements, 5G defines a quality of service (quality of service, QoS) flow (flow)-based framework. The following describes an architecture of a QoS flow in the embodiments of this application.

FIG. 1 is a schematic diagram of a possible network architecture 100 according to an embodiment of this application. The network architecture 100 is a possible implementation form of an architecture of a QoS flow. As shown in FIG. 1, a terminal device may establish one or more sessions with a core network (core network, CN). A node may map data packets belonging to different sessions to different bearers, and map data packets belonging to a same session to one or more bearers. The QoS flow is a smallest granularity for QoS differentiation in the foregoing session. One session may include one or more QoS flows. A corresponding QoS flow identifier (QoS flow identifier, QFI) may be allocated to each QoS flow, and one QFI may be used to indicate one QoS flow. Services having a same QFI in a same session accept a same scheduling policy or same admission control. When a data packet is transmitted through a communications interface between a core network and a node, an encapsulation header of the data packet carries a QFI. As shown in FIG. 1, the communications interface between the core network and the node may be an N3 interface, or the communications interface between the core network and the node may be a next generation user plane (next-generation user plane, NG-U) tunnel (tunnel).

It should be noted that the session may be a packet data unit (packet data unit, PDU) session, and the bearer may be a data resource bearer (data resource bearer, DRB). The PDU session may be a connection established between the terminal device and a data network, and a type of the connection may be internet protocol (Internet protocol, IP), ethernet, or another type. In some embodiments, the method or the apparatus in this application is described by using an example in which the session is a PDU session and the bearer is a DRB. In addition, the core network may include a core network device. For example, the core network device may include any one of the following: a user plane function (user plane function, UPF) entity, an access and mobility management function (access and mobility management function, AMF), and a session management function (session management function, SMF).

In 5G, a data packet processing mechanism on an air interface is defined based on a DRB. Data packets served by one DRB have a same packet processing mechanism during air interface transmission. A plurality of DRBs may be established between the node and the terminal device to meet QoS flows with different packet processing requirements. It should be noted that a same DRB may have a mapping relationship with one QoS flow, or may have a mapping relationship with a plurality of QoS flows. Specifically, for downlink data transmission (downlink, DL), the node may map, based on a QFI identifier on the NG-U tunnel (namely, the N3 interface) and a QoS profile (profile) corresponding to the QFI, a data packet included in the QoS flow to a corresponding DRB, and performs downlink transmission. In correspondence to uplink data transmission (uplink, UL), the terminal device maps, based on a pre-configured mapping relationship between a QoS flow and a DRB, a data packet included in the QoS flow to a corresponding DRB, and performs uplink transmission.

Figure 2:
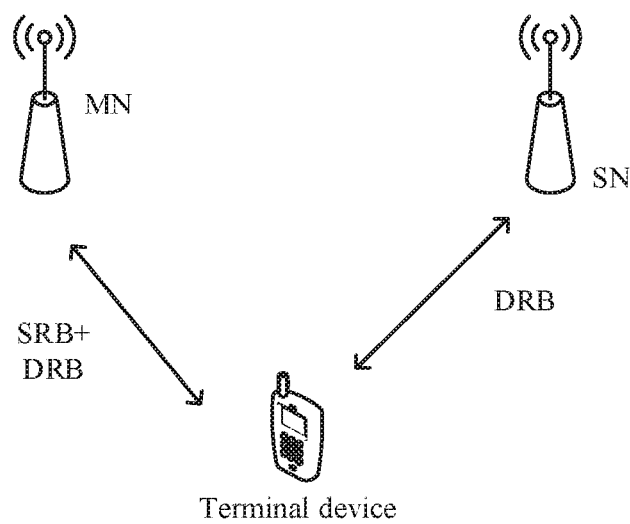
FIG. 2 is a schematic architecture diagram of a dual connectivity scenario according to an embodiment of this application.

FIG. 2 is a schematic architecture diagram of a dual connectivity scenario according to an embodiment of this application. As shown in FIG. 2, a master node (master node, MN) and a secondary node (secondary node, SN) are usually included in a dual connectivity scenario. The master node or the secondary node may also be respectively referred to as a master base station and a secondary base station. The master node and the secondary node may jointly serve a terminal device. In other words, for a same session established by the terminal device and the core network, the master node and the secondary node may perform data transmission with the terminal device at the same time. In a possible scenario, the master node may be responsible for a control plane signaling procedure and user plane data transmission with the terminal device, and the secondary node only needs to be responsible for user plane data transmission with the terminal device. To be specific, the master node may establish a data resource bearer (data resource bearer, DRB) and a signaling resource bearer (signal resource bearer, SRB) with the terminal device, and the secondary node only needs to establish a DRB with the terminal device. Alternatively, in another possible scenario, both the master node and the secondary node may be responsible for control plane transmission and user plane data transmission with the terminal device. To be specific, the master node may establish a DRB and an SRB with the terminal device, and the secondary node may also establish a DRB and an SRB with the terminal device. Usually, one master node and at least one secondary node may be included in a dual connectivity scenario. The following uses a case in which one master node and one secondary node are included in a dual connectivity scenario as an example for description.

For example, in a dual connectivity scenario, in some embodiments, both the master node and the secondary node may be NR nodes. Alternatively, in some other embodiments, the master node may be a node in LTE, and the secondary node may be art NR node. Alternatively, in still some other embodiments, the master node may be an NR node, and the secondary node may be an LTE node.

Figure 3:
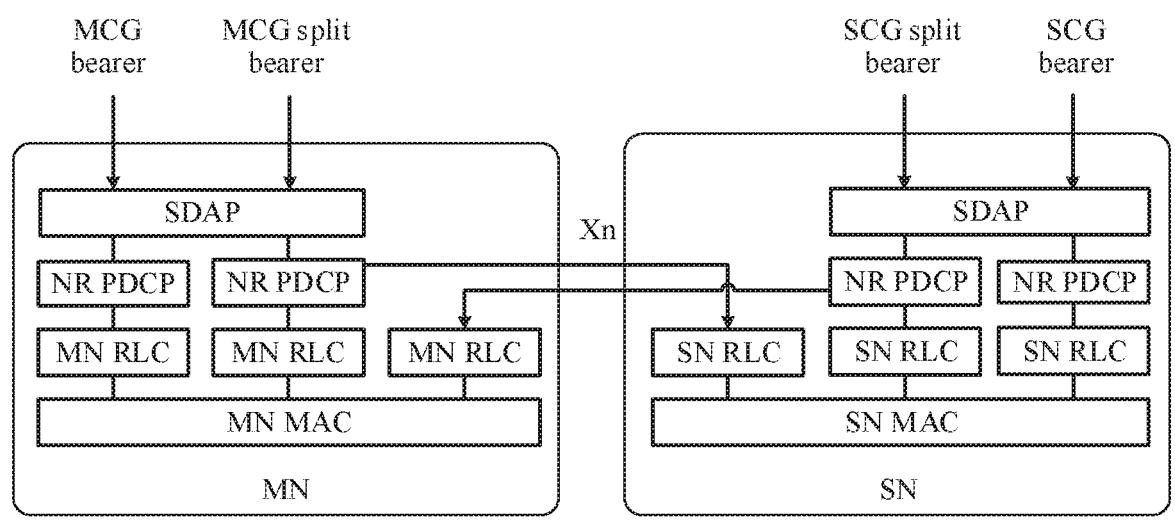
FIG. 3 is a schematic diagram of an application scenario of a type of a bearer in the related art.

FIG. 3 is a schematic diagram of a type of a bearer in the related art. As shown in FIG. 3, a node in a dual connectivity scenario may support the following types of bearers: an MCG bearer, an MCG split (split) bearer, an SCG bearer, and an SCG split (split) bearer. As shown in FIG. 3, a path corresponding to the MCG bearer passes through all protocol layers inside a master node. A path corresponding to the SCG bearer passes through all protocol layers inside a secondary node. A path corresponding to the MCG split bearer passes through an SDAP layer and a PDCP layer of the master node, and a radio link control (radio link control, RLC) layer and a protocol layer below the RLC layer of the secondary node. A path corresponding to the SCG split bearer passes through an SDAP layer and a PDCP layer of the secondary node, and an RLC layer and a protocol layer below the RLC layer of the master node.

FIG. 3 shows some protocol layers inside the node. The protocol layers include an SDAP layer, a PDCP layer, an RLC layer, and a MAC layer from top to bottom in sequence. A radio access protocol system is usually divided into three layers. To be specific, a layer 1 is a physical (physical, PHY) layer, a layer 2 is a data link (data link) layer, and a layer 3 is an RRC layer. The data link layer includes the following sublayers: a MAC layer, an RLC layer, and a PDCP layer from bottom to top in sequence. In this embodiment of this application, there is further an SDAP protocol layer above the PDCP layer. A function of the SDAP layer includes but is not limited to processing mapping from QoS flow to DRB. In some embodiments, protocol layers inside the node or the terminal device are not limited to the protocol layers shown in FIG. 3. The protocol layers may include more or fewer protocol layers. Alternatively, names of the protocol layers may be different. For example, in a possible protocol layer architecture, the foregoing PDCP layer may not be included.

In FIG. 3, because the SDAP layer is used to process mapping from QoS flow to bearer, before the QoS flow is transmitted to the PDCP layer, the QoS flow is already first mapped to the bearer. For the MCG split bearer and the SCG split bearer, path selection is performed at a PDCP layer in the prior art. Only a bearer granularity-based path selection is supported. However, a QoS flow granularity-based path selection cannot be performed. In other words, when a type of bearer to which the QoS flow is mapped is determined, a path through which the QoS flow is transmitted is determined. For a single QoS flow, the QoS flow granularity-based path selection cannot be implemented for the QoS flow, or a path cannot be autonomously selected for a QoS flow for transmission. In addition, in this solution, when a network determines to map the QoS flow to another type of bearer, the network needs to notify a core network to perform path switching. Therefore, additional signaling overheads are introduced.

Figure 4:
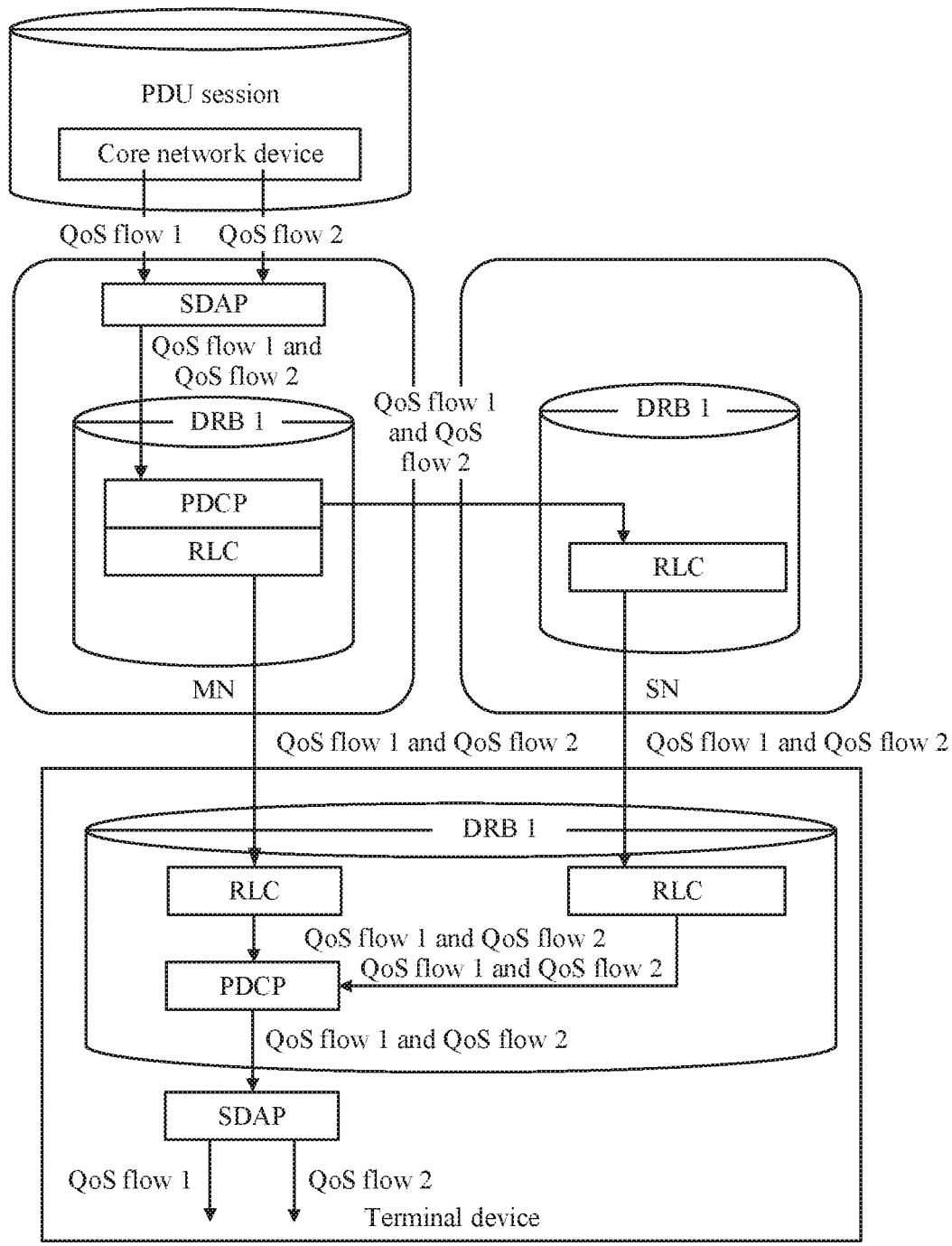
FIG. 4 is a schematic diagram of a QoS flow transmission path in the related art.

FIG. 4 is a schematic diagram of a transmission path of an MCG split bearer in the related art. A process of transmission by using an SCG split bearer is similar to the descriptions of the MCG split bearer, and details are not described herein again. It can be learned from FIG. 3 and FIG. 4 that the MCG split bearer includes two paths. One path passes through a PDCP layer of the master node and a protocol layer below the PDCP layer of the secondary node. The other path is a path between the master node and the terminal device, to be specific, the path passes through a protocol layer of the master node and does not pass through any protocol layer of the secondary node. Still referring to FIG. 4, during downlink transmission, at an SDAP layer of the master node, both a first QoS flow (namely, a QoS flow 1 in FIG. 4) and a second QoS flow (namely, a QoS flow 2 in FIG. 4) are mapped to a first DRB (namely, a DRB 1 in FIG. 4). At the PDCP layer of the master node, when a PDCP PDU is allocated to the foregoing two paths, because both the first QoS flow and the second QoS flow are mapped to the first DRB, QoS flow information cannot be distinguished based on the PDCP PDU. Therefore, QoS flow level-based allocation cannot be performed, and only PDCP PDU level path allocation can be performed. Correspondingly, during uplink transmission, a PDCP layer of the terminal device cannot distinguish the QoS flow information. Therefore, QoS flow level allocation cannot be performed, and only PDCP PDU level path allocation can be performed.

An embodiment of this application is intended to provide a communication method, to implement QoS flow granularity-based path selection in a radio access network (radio access network, RAN), or implement autonomous path selection for a QoS flow for transmission. The communication method provided in this application is applicable to a dual connectivity scenario or a multi-connectivity scenario. For example, the communication method may be applicable to a dual connectivity scenario of connecting to a 5G core network.

An embodiment of this application provides a QoS flow granularity-based bearer solution. The bearer solution supports transmission of a QoS flow through a first path. The first path passes through the SDAP layer of the master node and the protocol layer below the SDAP layer of the secondary node, or the first path passes through the SDAP layer of the secondary node and the protocol layer below the SDAP layer of the master node. The foregoing bearer solution may be applied to an uplink transmission scenario, or may be applied to a downlink transmission scenario.

The protocol layers below the SDAP layer are all protocol layers below the SDAP layer and do not include the SDAP layer. For example, protocol layers below the SDAP layer include a PDCP layer, an RLC layer, and a MAC layer.

Further, the bearer solution may further support transmission of a QoS flow through a second path. When the first path passes through the SDAP layer of the master node and the protocol layer below the SDAP layer of the secondary node, the second path is a path between the master node and the terminal device. When the first path passes through the SDAP layer of the secondary node and the protocol layer below the SDAP layer of the master node, the second path is a path between the secondary node and the terminal device.

That the second path is the path between the master node and the terminal device is that the second path passes through only the protocol layer of the master ode and the protocol layer of the terminal device, and does not pass through any protocol layer of the secondary node. Similarly, that the second path is the path between the secondary node and the terminal device is that the second path passes through only the protocol layer of the secondary node and the protocol layer of the terminal device, and does not pass through any protocol layer of the master node.

In this embodiment of this application, the QoS flow may be transmitted by using the SDAP layer of the master node and the protocol layer below the SDAP layer of the secondary node, or may be transmitted by using the SDAP layer of the secondary node and the protocol layer below the SDAP layer of the master node, so that flexibility of transmitting the QoS flow through a transmission path is improved, thereby improving communication efficiency.

Further, because a path is selected at the SDAP layer for the QoS flow, the QoS flow may be mapped to the bearer after the path is selected for the QoS flow, so that the path can be selected based on a QoS flow granularity, thereby improving flexibility and efficiency of data transmission.

Figure 5:
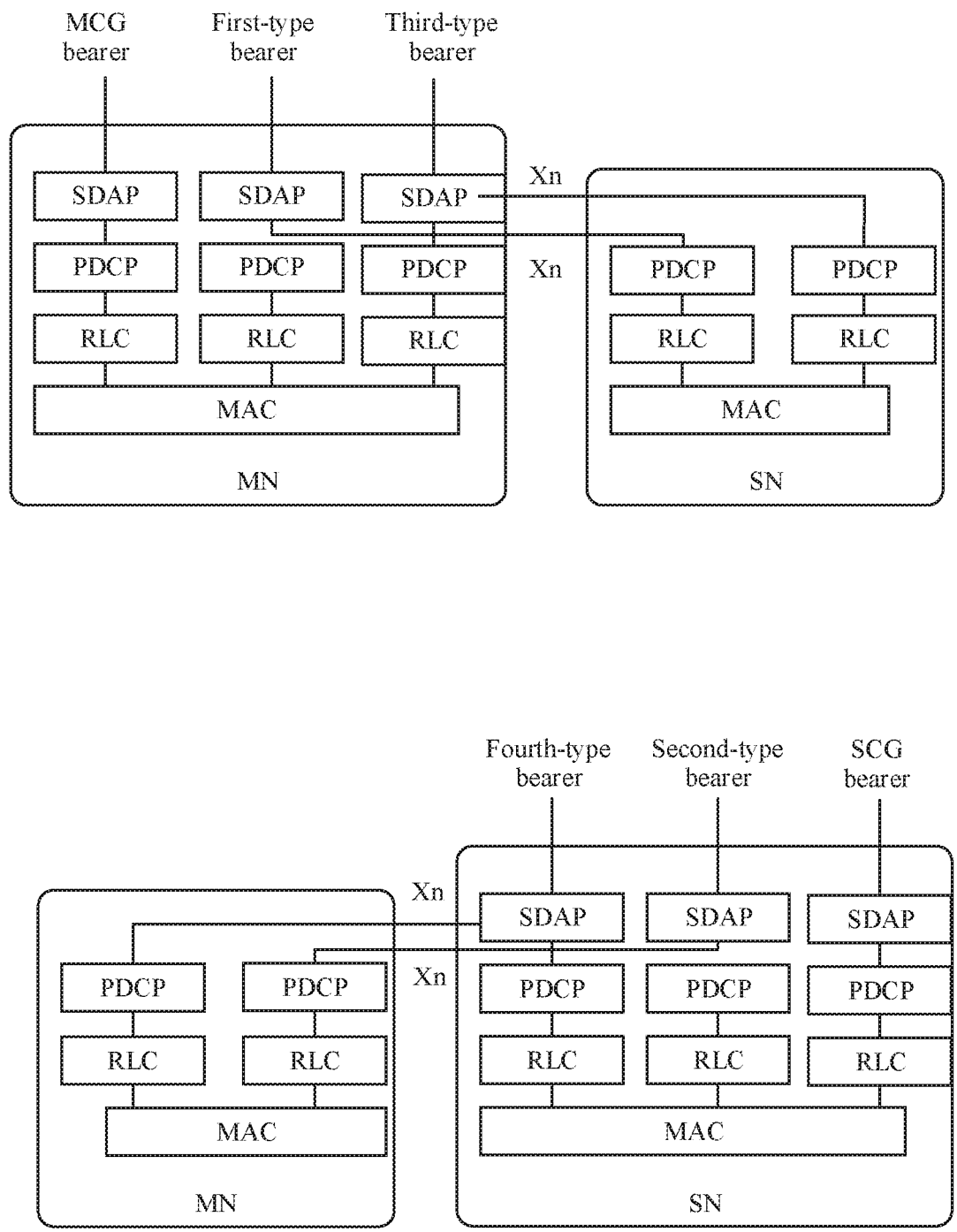
FIG. 5 is a schematic diagram of an application scenario of a type of a bearer according to an embodiment of this application.
Figure 6:
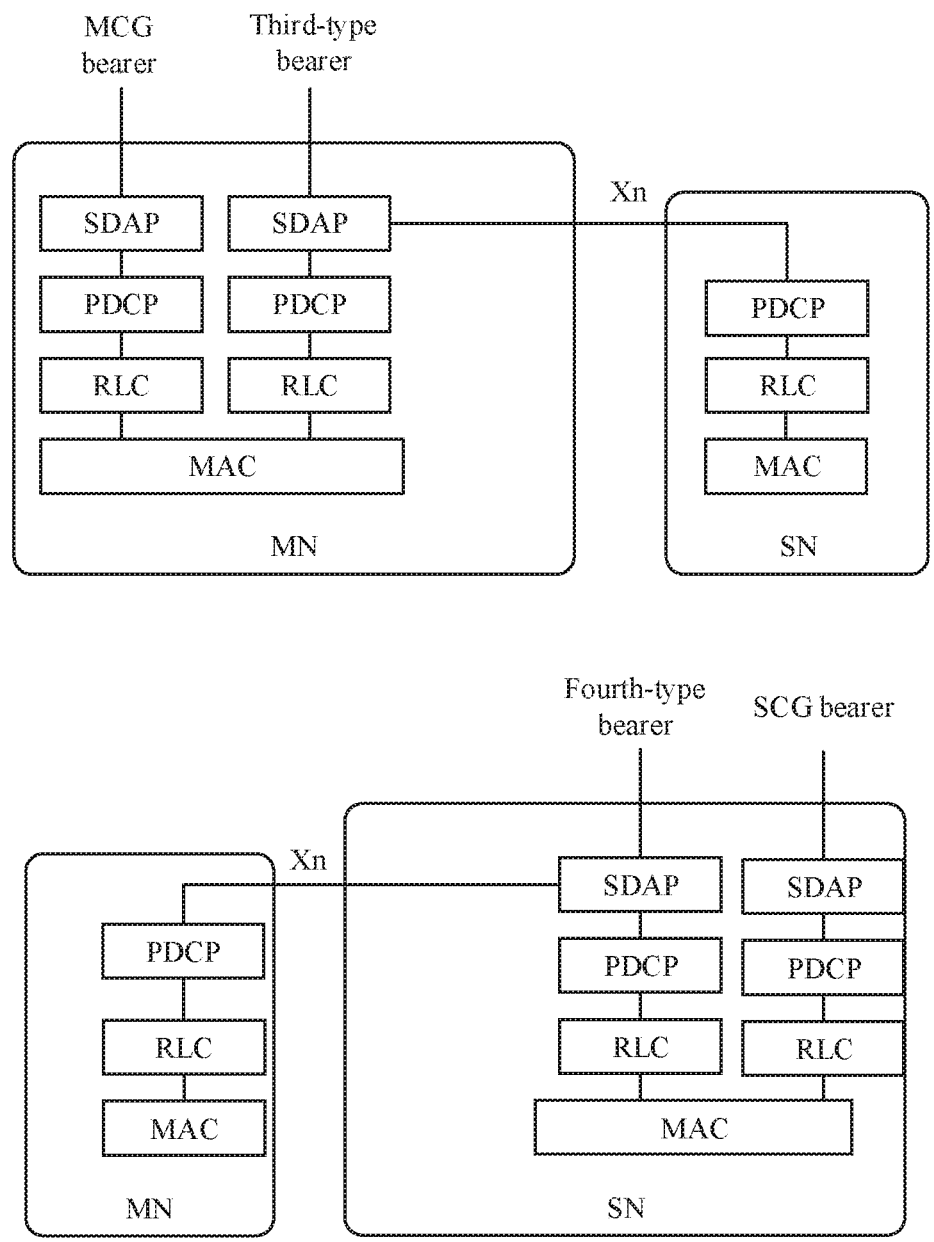
FIG. 6 is a schematic diagram of an application scenario of a type of a bearer according to another embodiment of this application.
Figure 7:
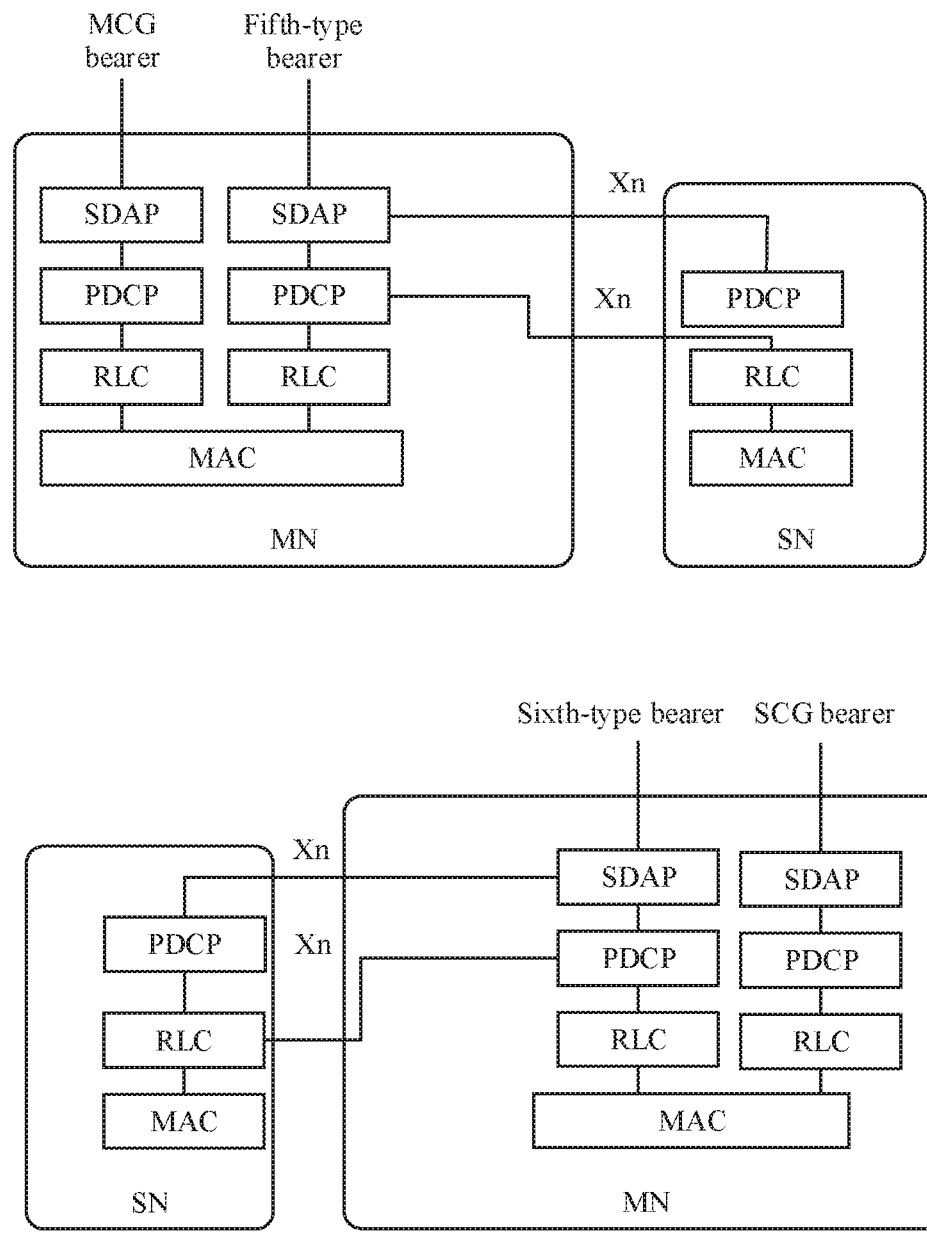
FIG. 7 is a schematic diagram of an application scenario of a type of a bearer according to another embodiment of this application.

FIG. 5 to FIG. 7 separately show solutions of three possible application scenarios according to embodiments of this application. The bearer solution may specifically include a plurality of types of bearers based on different supported paths or quantities of paths. For example, FIG. 5 to FIG. 7 show a first-type bearer to a sixth-type bearer that are introduced in the embodiments of this application.

A type of a bearer of a first application scenario solution shown in FIG. 5 includes an MCG bearer, an SCG bearer, a first-type bearer, a second-type bearer, a third-type bearer, and a fourth-type bearer. The MCG bearer or the SCG bearer transmits a QoS flow through a second path. The first-type bearer or the second-type bearer supports transmission of the QoS flow only through a first path. The third-type bearer or the fourth-type bearer supports transmission of the QoS flow through the first path and/or the second path. Specifically, first paths corresponding to the first-type bearer and the third-type bearer pass through an SDAP layer of a master node and a protocol layer below an SDAP layer of a secondary node. First paths corresponding to the second-type bearer and the fourth-type bearer pass through an SDAP layer of the secondary node and a protocol layer below SDAP of the master node. A second path corresponding to the third-type bearer is a path between the master node and a terminal device, and a second path corresponding to the fourth-type bearer is a path between the secondary node and the terminal device. In addition, Xn in FIG. 5 to FIG. 7 represents a communications interface between base stations, namely, a communications interface between the master node and the secondary node.

For the third-type bearer and the fourth-type bearer, three path transmission modes may be used to transmit the QoS flow. In the first path transmission mode, the QoS flow is transmitted through the first path. In the second path transmission mode, the QoS flow is transmitted through the second path. In the third path transmission mode, the QoS flow is transmitted through both the first path and the second path. Further, the third path transmission mode may include two cases. In a first case, duplicate transmission of the QoS flow is performed through the first path and the second path. In a second case, different data packets of the QoS flow are transmitted through the first path and the second path, that is, duplicate transmission of the QoS flow is not performed between the first path and the second path. In addition, in a transmission process, the foregoing three path transmission modes may be further dynamically adjusted, that is, the path transmission modes may be dynamically switched.

A solution of a second application scenario shown in FIG. 6 includes an MCG bearer, an SCG bearer, a third-type bearer, and a fourth-type bearer. The MCG bearer or the SCG bearer supports transmission of a QoS flow through a second path. The third-type bearer or the fourth-type bearer supports transmission of the QoS flow through a first path and/or the second path, and supports dynamic adjustment of a path transmission mode.

A solution of a third application scenario shown in FIG. 7 includes an MCG bearer, an SCG bearer, a fifth-type bearer, and a sixth-type bearer. The fifth-type bearer and the sixth-type bearer support transmission of a QoS flow through a first path, a second path, and/or a third path. The third path passes through a PDCP layer of a master node and a protocol layer below a PDCP layer of a secondary node, or the first path passes through the PDCP layer of the secondary node and a protocol layer below the PDCP layer of the master node. Protocol layers below the PDCP layer are all protocol layers below the PDCP layer. Specifically, a first path and a second path that correspond to the fifth-type bearer are the same as those corresponding to the third-type bearer. A first path and a second path that correspond to the sixth-type bearer are the same as those corresponding to the fourth-type bearer. A third path corresponding to the fifth-type bearer passes through the PDCP layer of the master node and the protocol layer below the PDCP layer of the secondary node. A third path corresponding to the sixth-type bearer passes through the PDCP layer of the secondary node and the protocol layer below the PDCP layer of the master node.

For the fifth-type bearer and the sixth-type bearer, the QoS flow may be transmitted in a plurality of path transmission modes. For example, the QoS flow is separately transmitted through the first path, the QoS flow is separately transmitted through the second path, the QoS flow is separately transmitted through the third path, the QoS flow is transmitted through both the first path and the second path, the QoS flow is transmitted through both the second path and the third path, the QoS flow is transmitted through both the first path and the third path, or the QoS flow is transmitted through the first path, the second path, and the third path together. In addition, in a transmission process, the foregoing plurality of path transmission modes may be further dynamically adjusted.

It should be noted that the MCG bearer, the first-type bearer, the third-type bearer, or the fifth-type bearer may all be classified as a master node terminated (MN terminated) bearer. In other words, an SDAP layer in a protocol stack corresponding to the foregoing bearer is located on the master node. The SCG bearer, the second-type bearer, the fourth-type bearer, and the sixth-type bearer may all be classified as a secondary node terminated (SN terminated) bearer. In other words, an SDAP layer in a protocol stack corresponding to the foregoing bearer is located on the secondary node. Certainly, the bearer does not need to be limited to a name of the bearer, or another possible naming scheme may be used. This is not limited in this application.

Figure 8:
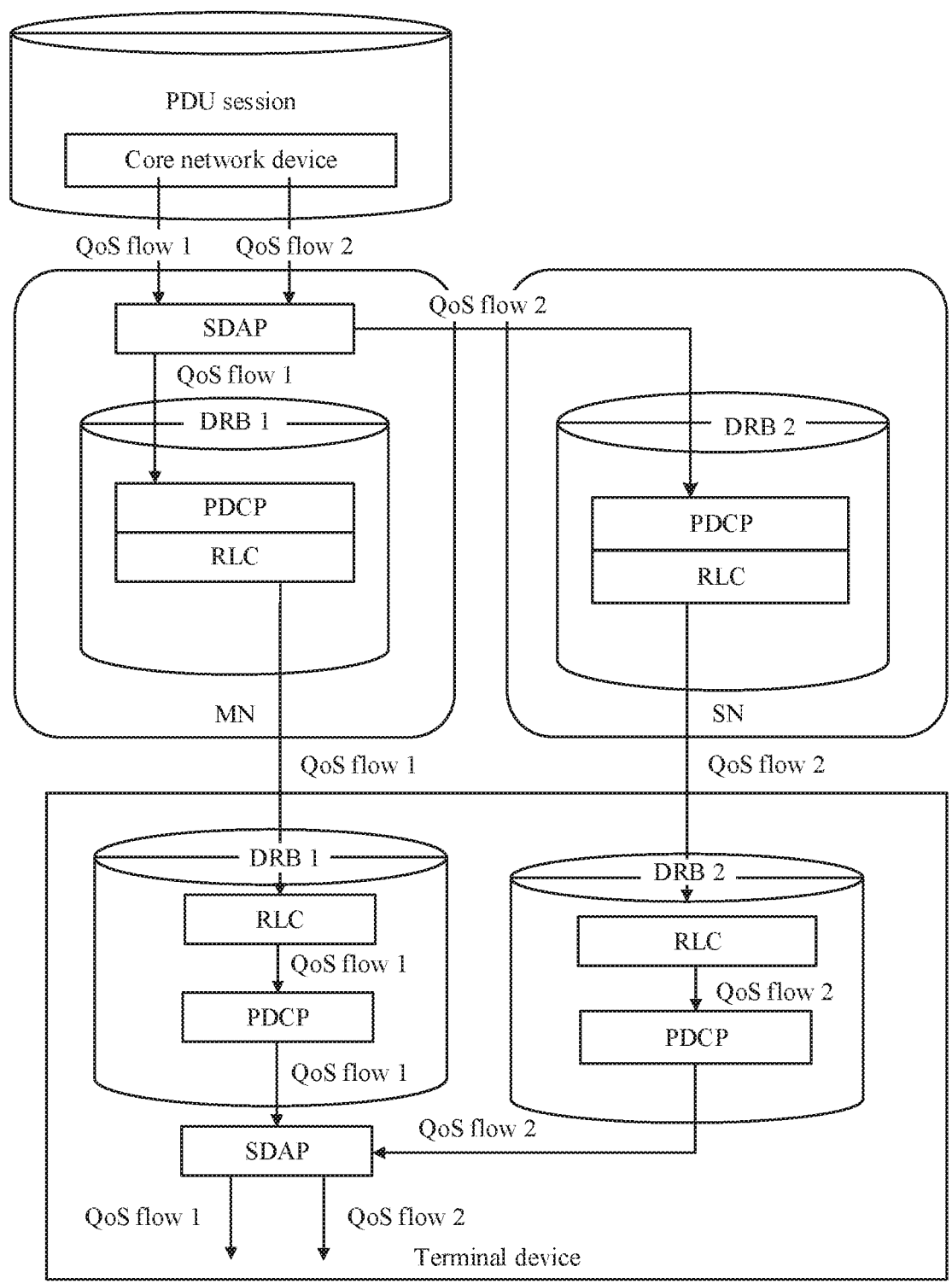
FIG. 8 is a schematic diagram of a QoS flow transmission path according to an embodiment of this application.

FIG. 8 is a schematic diagram of a scenario in which a QoS flow is transmitted according to an embodiment of this application. This shows a scenario in which a single QoS flow is transmitted in downlink through one path. In other words, at any moment of transmission, a single QoS flow is transmitted through only one path. A first QoS flow (a QoS flow 1) is mapped to a first DRB (DRB 1), and a second QoS flow (a QoS flow 2) is mapped to a second DRB (DRB 2). The foregoing first DRB may be an MCG bearer, and the foregoing second DRB may be a first-type bearer, a third-type bearer, or a fifth-type bearer. When the second DRB is the third-type bearer or the fifth-type bearer, a path transmission mode of the second DRB is transmitting a QoS flow through a first path. Therefore, a data packet included in the first QoS flow is transmitted through a path between a master node and a terminal device. An SDAP PDU is obtained after a data packet included in the second QoS flow is processed at an SDAP layer of the master node. Then the SDAP PDU is transferred to a secondary node through an interface between nodes, and continues to be transmitted in downlink by a protocol layer below the SDAP layer of the secondary node. An interface between the foregoing nodes may be an Xn interface. A corresponding uplink transmission scenario is similar to the descriptions of the downlink transmission scenario, and details are not described again.

Figure 9:
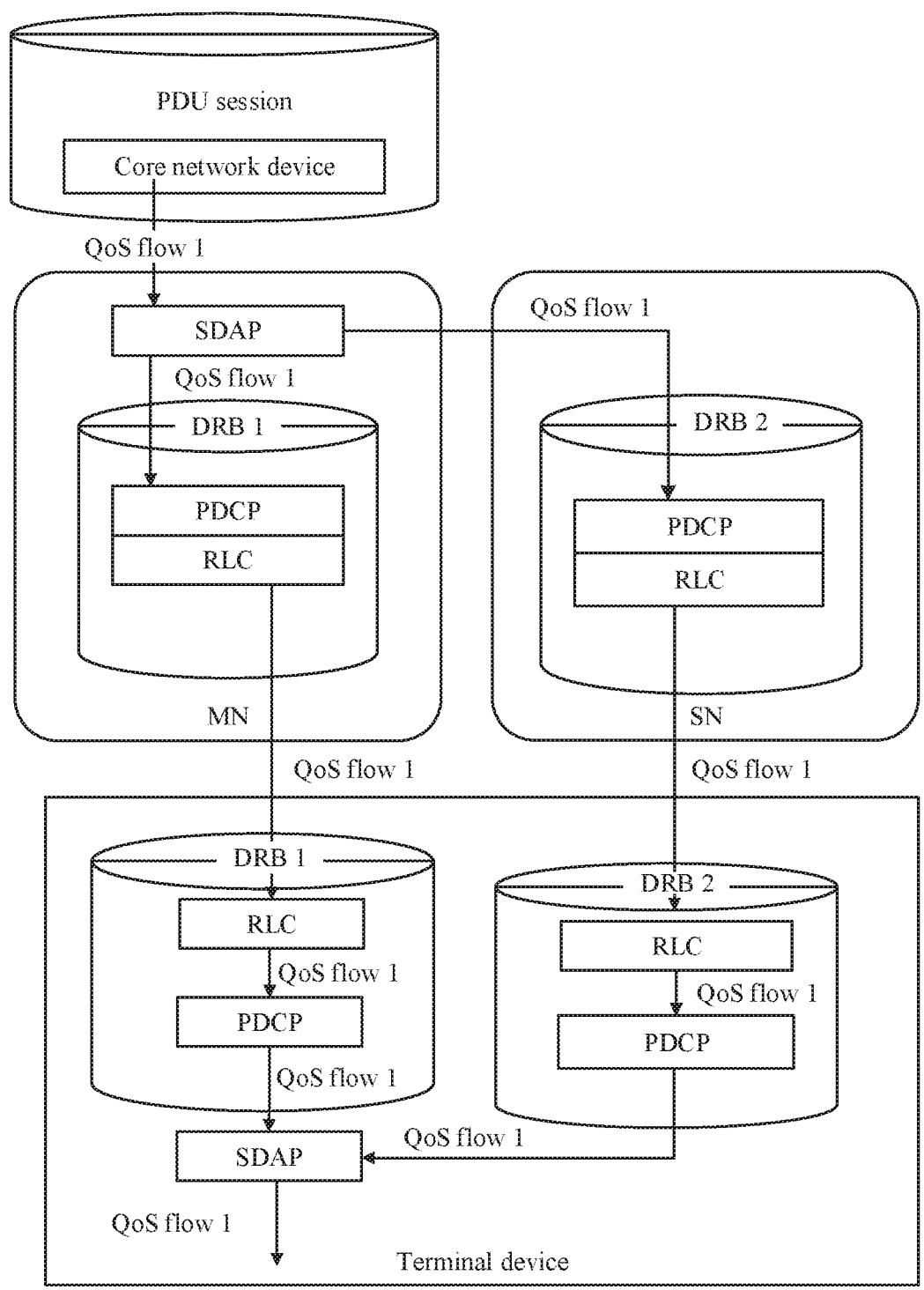
FIG. 9 is a schematic diagram of a QoS flow transmission path according to another embodiment of this application.

FIG. 9 is a schematic diagram of a scenario in which a QoS flow is transmitted according to another embodiment of this application. This shows a scenario in which a single QoS flow is jointly transmitted in downlink through two paths. That is, a first QoS flow (a QoS flow 1) is transmitted through a first path and a second path. The first QoS flow is mapped to a first DRB (DRB 1) and a second DRB (DRB 2). In an implementation, a same QoS flow is mapped to one bearer for transmission, that is, the first DRB and the second DRB may be a same bearer. For example, the bearer may be a third-type bearer or a fifth-type bearer, and a path transmission mode of the bearer is transmitting through both the first path and the second path. In another implementation, a same QoS flow may be mapped to two bearers, that is, the first DRB and the second DRB may be different bearers. For example, the first DRB may be an MCG bearer, and the second DRB may be a first-type bearer, a third-type bearer, or a fifth-type bearer. A path transmission mode of the third-type bearer and a path transmission mode of the fifth-type bearer are transmitting a QoS flow through a first path. Duplicate transmission of the first QoS flow may be performed through the first path and the second path. Alternatively, different data packets of the first QoS flow may be separately transmitted through the first path and the second path. A corresponding uplink transmission scenario is similar to the descriptions of the downlink transmission scenario, and details are not described again.

In addition, for downlink transmission, a terminal device needs to distinguish, from QoS flows, a QoS flow split at the SDAP layer. For uplink transmission, a node also needs to distinguish, from QoS flows, a QoS flow split at the SDAP layer. For example, a serial number (serial number) may be added to a frame header of an SDAP PDU included in the QoS flow. The serial number is used to indicate a rank of the SDAP PDU, so that a reordering function is performed at the SDAP layer, to distinguish different data packets of QoS flows through different transmission paths.

Optionally, the serial number in the SDAP frame header may be ordered in two manners. In the first ordering manner, an independent serial number may be added to an SDAP PDU of each QoS flow that allows to be transmitted through two paths. In the second ordering manner, a same serial number may be added to SDAP PDUs of all QoS flows mapped to a same bearer. Further, a reordering function may be further added to the SDAP layer, and a reordering timer (re-ordering timer) is defined. In an implementation, one reordering timer may be defined for each QoS flow. In a second implementation, one reordering timer is defined for a plurality of QoS flows that allow to be transferred through two paths. For example, when a receive end receives a new SDAP PDU, if the reordering timer is running, and a serial number of an SDAP PDU that triggers the reordering timer is already delivered to a higher layer, the receive end resets the reordering timer based on a serial number of a new SDAP PDU. If the reordering timer is not started, and at least one SDAP SDU is not delivered to a higher layer, the reordering timer is started.

Figure 10:
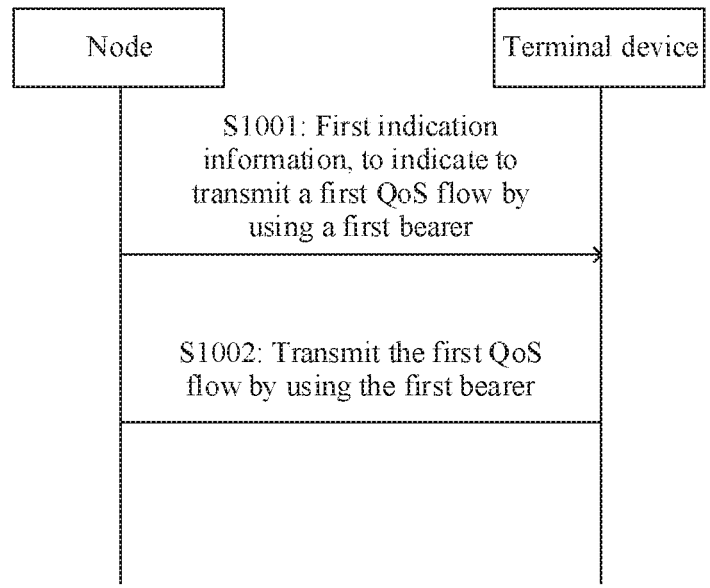
FIG. 10 is a schematic interaction diagram of a communication method according to an embodiment of this application.

FIG. 10 is a schematic flowchart of a communication method 1000 according to an embodiment of this application. The method 1000 may be applied to the application scenarios in FIG. 5 to FIG. 9, and the method 1000 includes the following steps.

S1001: A node sends first indication information to a terminal device, and correspondingly, the terminal device receives the first indication information, where the first indication information is used to indicate to transmit a first QoS flow by using a first bearer, the node is a master node or a secondary node, and a protocol stack corresponding to the first bearer supports transmission of the QoS flow through a first path, where the first path passes through a service data adaptation protocol SDAP layer of the master node and a protocol layer below an SDAP layer of the secondary node, or the first path passes through a service data adaptation protocol SDAP layer of the secondary node and a protocol layer below an SDAP layer of the master node.

The protocol layer below the SDAP layer may be all protocol layers below the SDAP layer, and does not include the SDAP layer. For example, as shown in FIG. 3, protocol layers below the SDAP layer include a PDCP layer and all protocol layers below the PDCP layer. Alternatively, protocol layers below the SDAP layer include a PDCP layer, an RLC layer, a MAC layer, and the like. In some examples, protocol layers inside the node or the terminal device are not limited to the protocol layers shown in FIG. 3. The protocol layers may include more or fewer protocol layers. Alternatively, names of the protocol layers may be different. For example, in a possible protocol layer architecture, the foregoing PDCP layer may not be included.

Optionally, the first bearer may be any one of a first-type bearer to a sixth-type bearer.

The foregoing node may be the master node. For example, when the first bearer is any one of the first-type bearer to the sixth-type bearer, the master node may send the first indication information to the terminal device. Alternatively, the node may be the secondary node. For example, when the first bearer is a secondary node terminated bearer, for example, a second-type bearer, a fourth-type bearer, or a sixth-type bearer, the secondary node may send the first indication information to the terminal device.

Optionally, the first indication information may be carried in RRC signaling. The first indication information may include the following information: an identifier of the first bearer, a type of a bearer of the first bearer, and information about a QoS flow mapped to the first bearer. The type of the bearer may be any one of the following: a first-type bearer, a second-type bearer, a third-type bearer, a fourth-type bearer, a fifth-type bearer, or a sixth-type bearer. The first indication information may explicitly indicate a type of the first bearer, or may indicate the type of the first bearer in a form of an index or a Boolean variable.

S1002: The node transmits the first QoS flow by using the first bearer.

That the node transmits the first QoS flow by using the first bearer is that the first QoS flow is mapped to the first bearer for transmission. That the node transmits the first QoS flow by using the first bearer may include that the master node and the secondary node coordinately perform uplink transmission or downlink transmission with the terminal device. Alternatively, one of the master node and the secondary node may transmit the first QoS flow to the terminal device.

In an embodiment, the master node may send the first indication information to the terminal device, and then the master node and the secondary node coordinately transmit the first QoS flow. In this case, the first bearer may be any bearer of the first-type bearer to the sixth-type bearer. A path transmission mode of each of the third-type bearer to the sixth-type bearer may be transmitting through the first path, or transmitting through both the first path and the second path. In another embodiment, the secondary node may send the first indication information to the terminal device, and then the master node and the secondary node coordinately transmit the first QoS flow. In this case, the first bearer may be the second-type bearer, the fourth-type bearer, or the sixth-type bearer. Path transmission modes of the fourth-type bearer and the sixth-type bearer may be transmitting through the first path or transmitting through both the first path and the second path.

In another embodiment, the master node may send the first indication information, and the master node transmits the first QoS flow. In this case, the first bearer is the third-type bearer or the fifth-type bearer, and the path transmission mode is transmission through the second path. Alternatively, the secondary node may send the first indication information, and the secondary node transmits the first QoS flow. In this case, the first bearer is the fourth-type bearer to the sixth-type bearer, and the path transmission mode is transmission through the second path.

In addition, the foregoing S1001 part and S1002 part may alternatively be performed by different nodes. For example, the master node may further send the first indication information, and the secondary node transmits the first QoS flow. In this case, the first bearer is the fourth-type bearer or the sixth-type bearer, and the path transmission mode of the fourth-type bearer or the sixth-type bearer is transmitting through the second path.

In this embodiment of this application, the QoS flow may be transmitted by using the SDAP layer of the master node and the protocol layer below the SDAP layer of the secondary node, or may be transmitted by using the SDAP layer of the secondary node and the protocol layer below the SDAP layer of the master node, so that flexibility of transmitting the QoS flow through a transmission path is improved, thereby improving communication efficiency.

Figure 11:
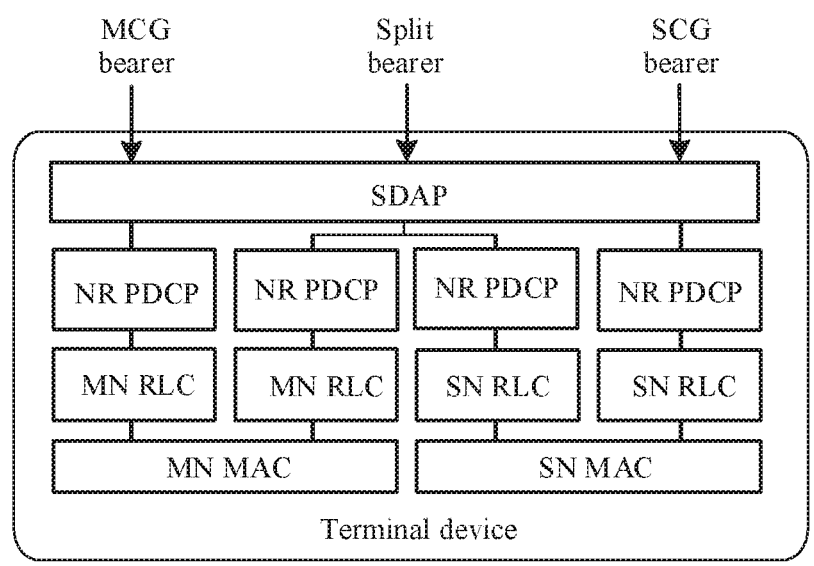
FIG. 11 is a schematic diagram of an application scenario of a type of a bearer according to another embodiment of this application.

In some examples, on a terminal device side, when a bottom-layer protocol of a bearer to which a QoS flow is mapped is located on the master node, for example, a second path of an MCG bearer, a second-type bearer, or a third-type bearer, a terminal device transmits data by using the master node. When a bottom-layer protocol of the bearer to which the QoS flow is mapped is located on a secondary node, for example, a first path of an SCG bearer, a first-type bearer, or a third-type bearer, the terminal device transmits data by using the secondary node. When a bottom-layer protocol of the bearer to which the QoS flow is mapped is located on both the master node and the secondary node, for example, when an MCG split bearer, an SCG split bearer, and the third-type bearer use the first path and the second path at the same time, the terminal device transmits data by using both the master node and the secondary node. Therefore, as shown in FIG. 11, for a terminal device side, there may be only three types of bearers: an MCG bearer, an SCG bearer, and a split bearer. The MCG bearer refers to data transmission between a terminal device and a master node, the SCG bearer refers to data transmission between the terminal device and a secondary node, and the split bearer refers to data transmission between the terminal device and both the master node and the secondary node. Therefore, for a node side and a terminal side, types of bearers of the node side and the terminal side are classified in different manners. Therefore, first indication information may indicate a type of a first bearer based on a classification mode on the node side, or may indicate a type of a first bearer based on a classification mode on the terminal device side.

In some examples, when the first bearer is a third-type bearer to a sixth-type bearer, a node further needs to configure path indication information, to indicate a path transmission mode of a first QoS flow. For the third-type bearer and a fourth-type bearer, the path transmission mode may include: separately transmitting the first QoS flow through a first path, separately transmitting the first QoS flow through a second path, or transmitting the first QoS flow through both the first path and the second path. Especially for uplink transmission, the node needs to indicate, to the terminal device, a path used to transmit the first QoS flow. In some examples, a path used by the terminal device for transmission is usually indicated by the master node. In some other examples, a path used by the terminal device for transmission may alternatively be indicated by the secondary node.

In some examples, there may be a scenario in which both the master node and the secondary node indicate a path used by the terminal device for transmission. The fifth-type bearer and the sixth-type bearer have more path transmission modes. For details, refer to the example in FIG. 7, For brevity, details are not described herein again.

Optionally, the node may alternatively send path adjustment information to the terminal device, and the path adjustment information is used to indicate to change the path transmission mode of the first QoS flow.

Optionally, the path indication information and the path adjustment information may be indicated by using a plurality of signaling formats. For example, RRC layer signaling, SDAP layer signaling, or MAC layer signaling may be used.

In this embodiment of this application, the path indication information or the path adjustment information is sent, to dynamically indicate or adjust the path transmission mode of the QoS flow, thereby improving QoS flow-based transmission efficiency.

Optionally, the node may indicate or adjust the QoS flow path transmission mode by using the following three solutions. In the first solution, both the path indication information and the path adjustment information may be carried in the RRC layer signaling. For example, the path indication information may be carried in an RRC message, and the path adjustment information may be carried in an RRC connection reconfiguration message. In an example, the RRC message includes initial configuration of the node for the terminal device, and the initial configuration includes path indication information, to indicate the path transmission mode of the QoS flow. In a subsequent process, the node may send the RRC connection reconfiguration message to the terminal device. The RRC connection reconfiguration message includes the path adjustment information, to indicate to change or reconfigure the path transmission mode of the QoS flow. An uplink transmission QoS flow and a downlink transmission QoS flow may be transmitted by using a same path transmission mode, or may be transmitted by using different path transmission modes.

In a second solution, the path indication information may be carried in the RRC signaling, and the path adjustment information may be carried in the SDAP signaling. The SDAP signaling may be a command used to dynamically switch (switch) a path. For example, the path transmission mode of the QoS flow may be initially configured by using the RRC signaling, and then the path transmission mode of the QoS flow is changed according to an instruction of the SDAP command. The SDAP signaling is used to dynamically adjust the transmission path. In some implementations, the foregoing SDAP signaling may be implemented based on an SDAP frame. The SDAP frame is a PDU of an SDAP layer, namely, an SDAP PDU. The SDAP PDU usually includes a frame header and data information. The frame header is usually used to indicate some control information, and the data information includes data transmitted from a previous protocol layer. The following describes schematic diagrams of several SDAP frame formats according to embodiments of this application with reference to FIG. 12 to FIG. 14.

Figure 12:
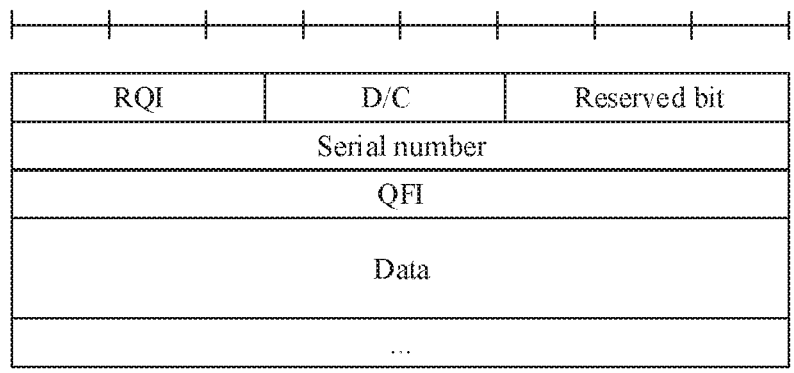
FIG. 12 is a schematic diagram of an SDAP frame format according to an embodiment of this application.

FIG. 12 is a schematic diagram of an SDAP frame format according to an embodiment of this application. As shown in FIG. 12, an SDAP frame may include the following identifiers: a D/C identifier, a QFI, and a reflective QoS indication (reflective QoS indication, RQI). The QFI represents an ID of a QoS flow, the D/C identifier represents whether the SDAP PDU is a data packet or a control packet (where D represents a data packet, and C represents a control packet), and the RQI is a reflective QoS indication. For example, if the terminal device receives the SDAP frame through a downlink path, the RQI in the SDAP frame is set to active (for example, RQI=1 represents active), and D/C indicates that the SDAP PDU is a control packet, the terminal device may send a data packet corresponding to the QFI through an uplink path that is the same as the downlink path. In addition, the SDAP may further include data (data), a serial number, and a reserved bit. The serial number represents a serial number indicating a rank of the SDAP PDU. R represents the reserved (reserved) bit.

Figure 13:
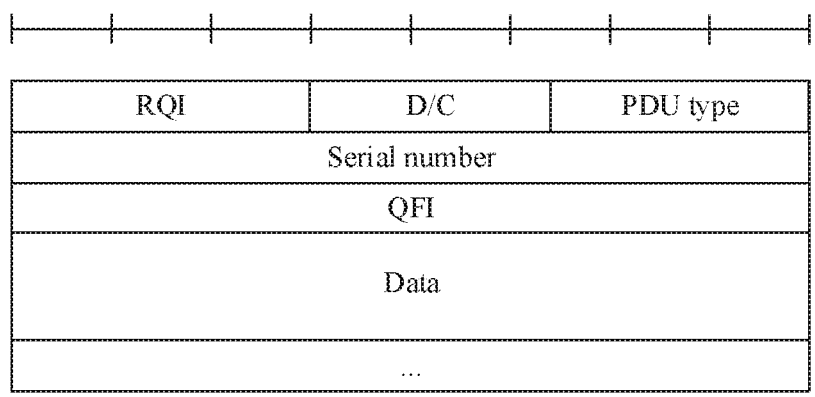
FIG. 13 is a schematic diagram of an SDAP frame format according to another embodiment of this application.

For another example, FIG. 13 is a schematic diagram of an SDAP frame format according to another embodiment of this application. As shown in FIG. 13, an SDAP frame may include a PDU type, an RQI, and a D/C identifier. The PDU type represents a control field type. A new PDU type may be defined to implement indication of a path transmission mode of a QoS flow. For example, a format of the PDU type may be listed in the following Table 1.

TABLE 1

| PDU type | Control field type |
| --- | --- |
| 000 | Flow path switching command |

For example, when a terminal device receives the SDAP frame, the PDU type indicates the flow path switching command (for example, PDU=000), and the RQI is set to active (for example, RQI=1 represents active), the terminal device may send a data packet corresponding to a QFI through an uplink path that is the same as a downlink path. The SDAP may further include data (data) and a serial number. The serial number indicates a rank of the SDAP PDU.

Figure 14:
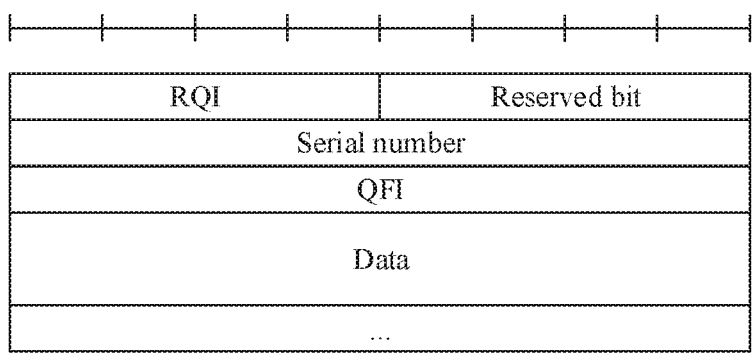
FIG. 14 is a schematic diagram of an SDAP frame format according to another embodiment of this application.

FIG. 14 is a schematic diagram of an SDAP frame format according to another embodiment of this application. As shown in FIG. 14, an SDAP frame may include the following identifiers: a QFI and an RQI. For example, if the terminal device receives the SDAP frame through a downlink path, the RQI in the SDAP frame is set to active (for example, RQI=1 represents active), the terminal device may send a data packet corresponding to the QFI through an uplink path that is the same as the downlink path. In addition, the SDAP may further include data (data), a serial number, and a reserved bit.

In a third solution of indicating or adjusting a path transmission mode, a node may pre-configure a profile for the terminal device, and the terminal device determines a currently used path transmission mode based on the preset profile. For example, the node may indicate, in initial configuration, the path transmission mode initially used by the terminal device and the preset profile. In a subsequent process, the terminal device may autonomously determine the currently used path transmission mode based on the preset profile. Alternatively, the node may indicate only the preset profile in the initial configuration, and the terminal device may determine an initial path transmission mode and a subsequent path transmission mode based on the preset profile. In an example, the node may send configuration indication information to the terminal device, and the configuration indication information is used to indicate the terminal device to: when a first preset condition is met, separately transmit a first QoS flow through a first path; when a second preset condition is met, separately transmit a first QoS flow through a second path; or when a third preset condition is met, transmit a first QoS flow through both a first path and a second path.

The first preset condition, the second preset condition, and the third preset condition may be preset conditions agreed upon by the node and the terminal device in advance. If a current condition meets one of the foregoing preset conditions, the terminal device transmits the first QoS flow in the path transmission mode corresponding to the preset condition. The first preset condition, the second preset condition, and the third preset condition are not specifically limited in this embodiment of this application. For example, the preset conditions may be conditions related to a current network status, for example, a load status of a current path, a buffer size (buffer) status of the first QoS flow, or a queue waiting time. One factor in the foregoing current network status may be considered, or a plurality of factors may be comprehensively considered, to select the path transmission mode.

In a specific embodiment, the node indicates an uplink data split threshold (UL data split threshold) of a QoS flow in the configuration indication information. When a buffer size (buffer) of an SDAP layer for the QoS flow exceeds the threshold, transmission is performed through two paths. Otherwise, one path is selected for separate transmission or transmission is performed through an initially configured path. In another specific embodiment, when a sum of a buffer size of the QoS flow at the SDAP layer, a buffer size of the QoS flow at a PDCP layer, and a buffer size of the QoS flow at an RLC layer exceeds the uplink data split threshold, the QoS flow is transmitted through two paths. Otherwise, one path is selected for separate transmission or transmission is performed through an initially configured path. In another specific embodiment, the node may indicate, in the configuration indication information, a queue waiting time threshold of a QoS flow. When a queue waiting time of the QoS flow on a terminal device side exceeds the time threshold, the QoS flow is transmitted through two paths. Otherwise, one path is selected for separate transmission or transmission is performed through an initially configured path.

In this embodiment of this application, the path transmission mode used by the QoS flow is indicated in a pre-configuration manner, and the terminal device may select the path transmission mode of the QoS flow based on the current network status and the preset condition indicated in the configuration indication information, thereby improving QoS flow-based transmission efficiency.

It should be noted that the foregoing SDAP frame format may also be defined based on a bearer level. For example, the QFI in the SDAP frame format may be replaced with a bearer identifier. In other words, all QoS flows mapped to the bearer may have a same SDAP format. In this embodiment of this application, in addition to a QoS flow level-based path switching, a bearer level-based path transmission mode selection and adjustment may also be supported, that is, switching one type of a bearer to another type of a bearer. In other words, all QoS flows mapped to a bearer are switched to another path transmission mode.

Optionally, in some embodiments, the method further includes: sending, by the node, switching indication information of a first bearer to the terminal device, where the switching indication information of the first bearer is used to indicate to switch a bearer to which the first QoS flow is mapped to a second bearer. The second bearer is any bearer other than the first bearer.

Modification indication information of the first bearer may be RRC signaling. For example, the RRC signaling may include the following information: an identifier of the second bearer to which the QoS flow is to be switched, a type of the second bearer, and information about the QoS flow mapped to the second bearer. A type of the DRB is any bearer of a first-type bearer to a sixth-type bearer. The switching indication information of the first bearer may explicitly indicate a type of a bearer to which the QoS flow is to be switched, or may indicate a type of the DRB in a form of an index or a Boolean variable. The information about the QoS flow mapped to the second bearer may be, for example, an identifier of the QoS flow.

Further, when a type of the bearer of the first QoS flow is switched, switching indication information of the second bearer may be sent between a master node and a secondary node, to indicate that the type of the bearer of the first QoS flow is switched. The switching indication information of the second bearer may be sent by using an Xn interface.

The switching indication information of the second bearer may indicate switching between various types of bearers, for example, switching between an MCG bearer and a first-type bearer/a third-type bearer, switching between an SCG bearer and a second-type bearer/a fourth-type bearer, or the like. This is not enumerated one by one herein.

In addition, if bearer switching occurs in a type of a master node terminated bearer, for example, switching from an MCG bearer to a first-type bearer or a third-type bearer, or in a type of a secondary node terminated bearer, for example, switching from an SCG bearer to a second-type bearer or a fourth-type bearer, a node on which an SDAP layer and a protocol layer above the SDAP layer that correspond to a bearer are located does not change. Therefore, the node does not need to notify a core network to perform path switching, thereby reducing signaling overheads.

In this embodiment of this application, based on configuration of a radio access network, the QoS flow may be transmitted between the terminal device and the node through one path, or the QoS flow may be jointly transmitted through two paths. This implements QoS flow level-based centralized control and management of the radio access network, and improves flexibility of a communications system.

Optionally, the node may alternatively send duplicate transmission indication information to the terminal device, and the duplicate transmission indication information is used to indicate to perform duplicate transmission of the QoS flow mapped to the first bearer through the first path and the second path. For example, when the first path and the second path are jointly used for transmission, the node may further send the duplicate transmission indication information to the terminal device. The node may determine, based on a current network status, whether to allow duplicate transmission. For example, the duplicate transmission may be determined based on load statuses of different paths. When load of the first path and the second path is greater than a predetermined threshold, it may be determined that the duplicate transmission is not allowed. When load of the first path and the second path is less than a predetermined threshold, it may be determined that the duplicate transmission is allowed. A value of the predetermined threshold may be determined according to specific practice.

In some examples, the node may alternatively send duplicate transmission stop indication information to the terminal device, and the duplicate transmission stop indication information is used to indicate to stop duplicate transmission of the QoS flow mapped to the first bearer through the first path and the second path. Alternatively, in some other examples, the duplicate transmission indication information may be used to indicate that an initial status of the QoS flow is allowing the duplicate transmission or not allowing the duplicate transmission. In a subsequent process, the node may send duplicate transmission change information to the terminal device, and the duplicate transmission change information is used to indicate to change a duplicate transmission mode of the first QoS flow.

Alternatively, the duplicate transmission indication information is used to indicate to perform duplicate transmission of data mapped to the first QoS flow through the first path and the second path. The duplicate transmission stop indication information is used to indicate to stop duplicate transmission of the data mapped to the first QoS flow through the first path and the second path.

In this embodiment of this application, the duplicate transmission indication information is sent, so that a transmission path mode of the QoS flow mapped to the first bearer can be flexibly configured, thereby improving QoS flow-based communication transmission efficiency.

In some embodiments, the duplicate transmission indication information or the duplicate transmission stop indication information may be configured by using RRC layer signaling. In some other embodiments, the foregoing information may alternatively be configured by using SDAP layer signaling. For example, still referring to FIG. 13, a PDU type in an SDAP frame may be used to indicate to allow duplicate transmission of a data packet corresponding to the QoS flow or indicate to stop duplicate transmission of a data packet corresponding to the QoS flow. For example, Table 2 lists another possible definition form of the PDU type. If the PDU type is set to 001, the SDAP frame indicates to allow the duplicate transmission of the data packet corresponding to the QoS flow. If the PDU type is set to 002, the SDAP frame indicates to stop the duplicate transmission of the data packet corresponding to the QoS flow.

TABLE 2

| PDU type | Control field type |
|---|---|
| 001 | Data packet duplicate command |
| 002 | Stop duplicate transmission of a data packet |

Figure 15:
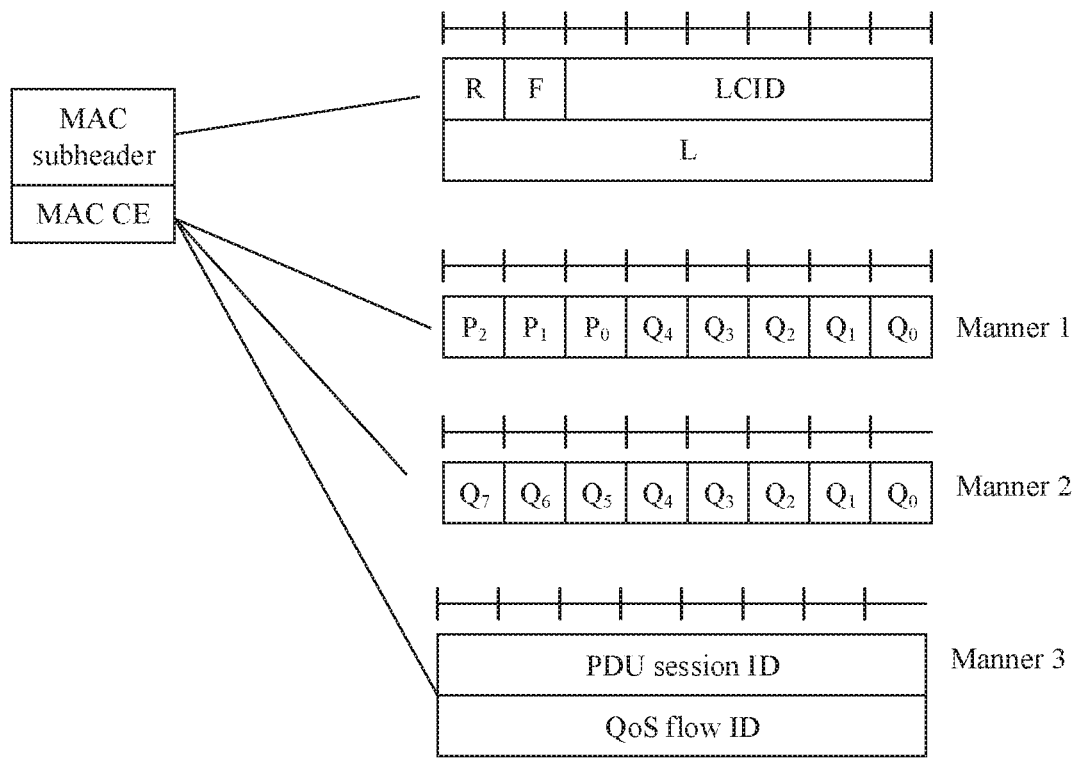
FIG. 15 is a schematic diagram of a MAC layer signaling format according to this application.

In some other embodiments, the duplicate transmission indication information may be further configured by using MAC layer signaling. For example, FIG. 15 is a schematic diagram of a format of MAC signaling. The MAC layer signaling includes a MAC subheader and a MAC control element (control element, CE). As shown in FIG. 14, the MAC subheader includes a logical channel identifier (logic channel identifier, LCID), used to indicate a logical channel identifier of data transmission or a type of the MAC layer signaling. As listed in Table 3, the LCID may define a new index value for duplicate transmission at a QoS flow level.

TABLE 3

| Index value (index) | LCID |
|---|---|
| 100001 | QoS flow duplicate command |

Optionally, in some examples, the MAC subheader may further include at least one of the following information: R, representing a reserved bit; L, representing a length of the MAC control element; and F, used to indicate a length of L. For example, when F=0, it indicates that L is 8 bits; when F=1, it indicates that L is 16 bits.

The MAC control element may be used to indicate whether the QoS flow is used for duplicate transmission. For example, the MAC control element may include an index of a QoS flow or an identifier of a QoS flow, and indicate whether to allow duplicate transmission of the QoS flow. In the MAC layer signaling, the terminal device cannot distinguish an ID of a PDU session corresponding to the MAC signaling. Therefore, the MAC layer signaling further needs to indicate an ID of a PDU session corresponding to the QoS flow.

As shown in Manner 1 in FIG. 15, some bits $P_0$, $P_1$, and $P_2$ in the MAC control element may be used to indicate the ID of the PDU session. For example, three bits may be used to identify an index value of the PDU session. Remaining bits $Q_0$ to $Q_5$ in the MAC control element may implicitly indicate one QoS flow separately. A correspondence between a bit and a QoS flow may be agreed upon in advance. For example, IDs of the QoS flow may be ordered based on values of the IDs, and are in a one-to-one correspondence with bits from the low-order bit to the high-order bit of the MAC control element. A value assigned to each of the remaining bits may be used to indicate whether to allow duplicate transmission of QoS flows corresponding to the remaining bits. For example, it is assumed that the bit $Q_i$ indicates an $i^{th}$ QoS flow. i indicates different bits. If $Q_i=1$, duplicate transmission of a corresponding $i^{th}$ QoS flow is allowed. If $Q_i=0$, duplicate transmission is not allowed.

As shown in Manner 2 in FIG. 15, the MAC control element may alternatively not indicate the ID of the PDU session. A new index value may be defined by the LCID in the MAC subheader to indicate the ID of the PDU session. Similar to Manner 1, bits $Q_0$ to $Q_8$ in the MAC control element are used to implicitly indicate one QoS flow separately. Whether a QoS flow corresponding to each bit allows duplicate transmission may be indicated based on a value assigned to the bit.

As shown in Manner 3 in FIG. 15, the MAC control element includes an ID of a PDU session and an ID of a QoS flow, and indicates to perform duplicate transmission or stop duplicate transmission based on the ID of the QoS flow of the corresponding PDU session. In an example of Manner 3, it is initially non-duplicate transmission by default, and after UE receives a command, the UE executes the duplicate transmission command by default. In another example of Manner 3, an additional bit Q may be further set in the MAC control element to indicate whether to execute the duplicate transmission command. For example, if Q=1, data mapped to a corresponding QoS flow performs the duplicate transmission if Q=0, the MAC control element does not allow the duplicate transmission.

An embodiment of this application provides a QoS flow level-based duplicate transmission solution. To be specific, duplicate transmission of data packets corresponding to a same QoS flow may be performed through the first path and the second path, thereby implementing reliability of a QoS flow granularity in radio access network transmission.

Optionally, a frame header of an SDAP PDU included in the first QoS flow includes a serial number, and the serial number is used to indicate a rank of SDAP PDUs. For example, the SDA frame formats shown in FIG. 12 to FIG. 14 may all include the serial number. In an example, when the QoS flow mapped to the first bearer is transmitted by using both the first path and the second path, the transmit end may add the serial number to the frame header of the SDAP PDU, and after the QoS flow is mapped to a DRB, transmit the SDAP PDU to the receive end through two paths. After receiving the QoS flow from the two paths at the SDAP layer, the receive end may perform ordering based on the serial number in the frame header of the SDAP. For uplink transmission, the sorted data packets may be transmitted to a core network. For downlink transmission, the ordered data packets may be transmitted to a higher layer above the SDAP layer. For specific content of the serial number, refer to the foregoing descriptions. Details are not described herein again.

In this embodiment of this application, the serial number is set in the frame header of the SDAP PDU included in the first QoS flow, to identify data packets transmitted on different paths, thereby improving QoS flow communication transmission efficiency.

In some examples, if duplicate transmission of the data packet corresponding to the QoS flow is performed through the first path and the second path, after receiving the SDAP PDU, the receive end may discard a duplicate received SDAP PDU based on the serial number of the SDAP layer.

Optionally, in a process in which the node transmits the first QoS flow by using the first bearer, because coordinated transmission between the master node and the secondary node is involved, the master node and the secondary node may exchange a message through a communications interface. For example, a type of a QoS flow or a type of a bearer corresponding to the QoS flow may be sent between the master node and the secondary node. Alternatively, other information of the QoS flow may be sent between the master node and the secondary node. For example, the other information includes whether the QoS flow carries an SDAP frame header and an SDAP frame header size (SDAP header size), so that a node that receives data performs an SDAP frame header compression and decompression function based on the SDAP frame header size. For another example, a QoS parameter of a QoS flow or a mapping relationship between a QoS flow and a bearer may be alternatively sent between the master node and the secondary node.

This application proposes traffic control between nodes based on a QoS flow granularity. For a classified master node terminated bearer, for example, a first-type bearer, a third-type bearer, or a fifth-type bearer, the master node may send the QoS flow granularity-based flow control signaling to the secondary node. For example, the flow control instruction may be used to indicate at least one of the following information: a QoS flow identifier, information indicating a period for the secondary node to report QoS flow status information, or information indicating a trigger condition for the secondary node to report the QoS flow status information. Correspondingly, the secondary node may, periodically or according to a trigger condition, report the QoS flow status information that is transferred in downlink by the secondary node to the master node. For example, an extension header of a general packet radio service tunneling protocol user plane (General Packet Radio Service tunneling protocol user plane, GTU-U) may include at least one of the following information: a maximum serial number of a successfully transmitted SDAP data packet and an expected buffer size of the QoS flow.

Correspondingly, for bearers classified as secondary node terminated bearers, for example, a second-type bearer, a fourth-type bearer, and a sixth-type bearer, the secondary node may send a QoS flow granularity-based flow control signaling request to the master node. A related procedure of the bearer is similar to that of a master node terminated bearer, and details are not described herein again.

In this embodiment of this application, QoS flow granularity-based traffic control can better ensure traffic control on an Xn interface, thereby improving system performance.

The foregoing describes in detail the communication methods in the embodiments of this application with reference to FIG. 1 to FIG. 15. The following describes in detail the node and the terminal device in the embodiments of this application with reference to FIG. 16 to FIG. 19.

Figure 16:
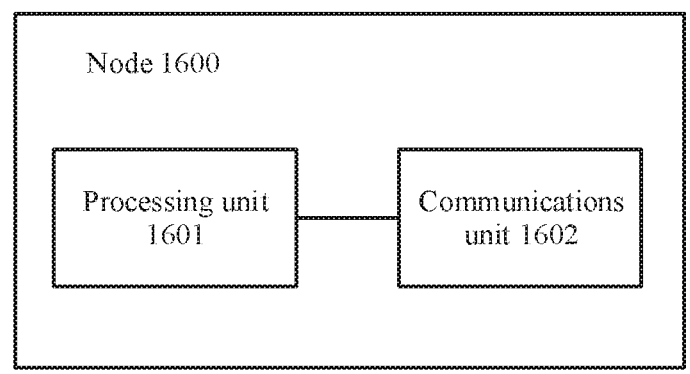
FIG. 16 is a schematic structural diagram of a node according to an embodiment of this application.

FIG. 16 is a schematic block diagram of a node 1600 according to an embodiment of this application. It should be understood that the node 1600 can perform steps that are performed by the node in the methods in FIG. 1 to FIG. 15. To avoid repetition, details are not described herein again. The node 1600 includes a processing unit 1601 and a communications unit 1602.

The processing unit 1601 is configured to: send first indication information to a terminal device by using the communications unit 1602, where the first indication information is used to indicate to transmit a first QoS flow by using a first bearer, the node 1600 is a master node or a secondary node, and a protocol stack corresponding to the first bearer supports transmission of a QoS flow through a first path, where the first path passes through an SDAP layer of the master node and a protocol layer below an SDAP layer of the secondary node, or the first path passes through an SDAP layer of the secondary node and a protocol layer below an SDAP layer of the master node; and transmit the first QoS flow by using the first bearer.

Figure 17:
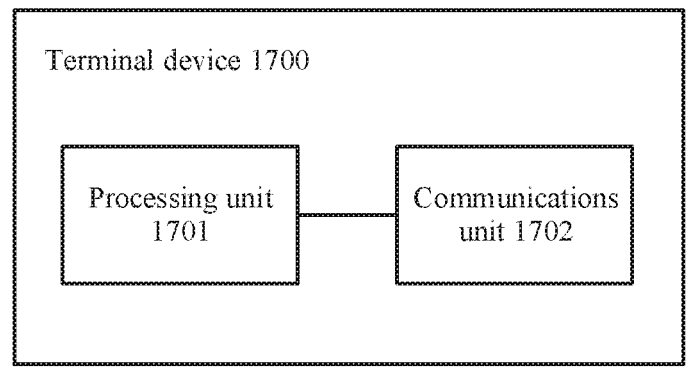
FIG. 17 is a schematic structural diagram of a terminal device according to an embodiment of this application.

FIG. 17 is a schematic block diagram of a terminal device 1700 according to an embodiment of this application. It should be understood that the terminal device 1700 can perform steps that are performed by the terminal device in the methods in FIG. 1 to FIG. 15. To avoid repetition, details are not described herein again. The terminal device 1700 includes a processing unit 1701 and a communications unit 1702.

The processing unit 1701 is configured to: receive first indication information by using the communications unit 1702, where the first indication information is used to indicate to transmit a first QoS flow by using a first bearer, and a protocol stack corresponding to the first bearer supports transmission of a QoS flow through a first path, where the first path passes through a SDAP layer of a master node and a protocol layer below an SDAP layer of a secondary node, or the first path passes through an SDAP layer of the secondary node and a protocol layer below an SDAP layer of the master node; and transmit the first QoS flow by using the first bearer.

Figure 18:
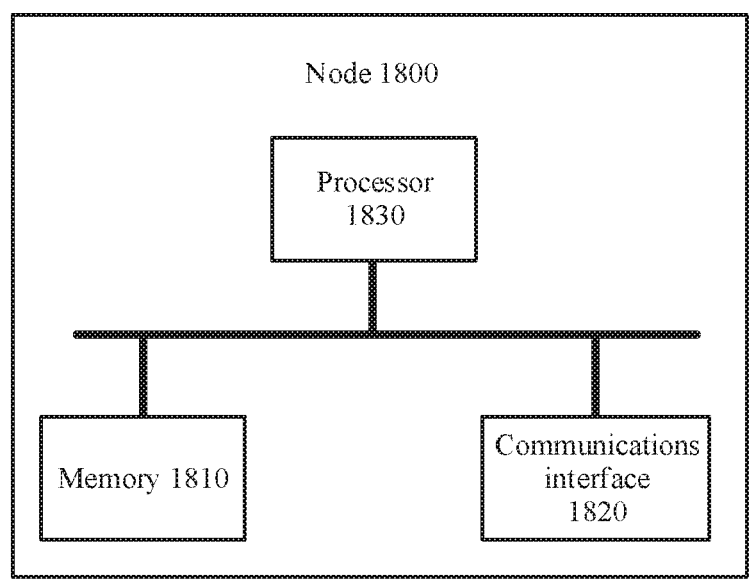
FIG. 18 is a schematic structural diagram of a node according to another embodiment of this application.

FIG. 18 is a schematic structural diagram of a node 1800 according to an embodiment of this application. As shown in FIG. 18, the node 1800 includes one or more processors 1830, one or more memories 1810, and one or more communications interfaces 1820. The processor 1830 is configured to control the communications interface 1820 to send and receive signals, and the memory 1810 is configured to store a computer program. The processor 1830 is configured to invoke the computer program from the memory 1810, and run the computer program, so that the node performs a corresponding procedure and/or operation performed by the node in the embodiments of the communication method in this application. For brevity, details are not described herein again.

Figure 19:
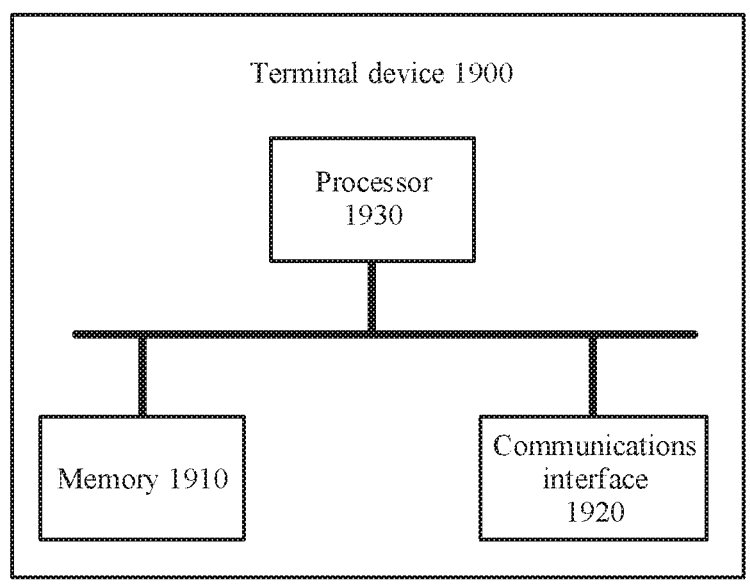
FIG. 19 is a schematic structural diagram of a terminal device according to another embodiment of this application.

FIG. 19 is a schematic structural diagram of a terminal device 1900 according to an embodiment of this application. As shown in FIG. 19, the terminal device 1900 includes one or more processors 1930, one or more memories 1910, and one or more communications interfaces 1920. The processor 1930 is configured to control the communications interface 1920 to send and receive signals, and the memory 1910 is configured to store a computer program. The processor 1930 is configured to invoke the computer program from the memory 1910, and run the computer program, so that the terminal device performs a corresponding procedure and/or operation performed by the terminal device in the embodiments of the communication method in this application. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
sending, by an access network node to a terminal device, indication information indicating to transmit a quality of service (QoS) flow by using a bearer, wherein a protocol stack corresponding to the bearer supports transmission of the QoS flow through a first path, wherein the first path passes through one of (1) a service data adaptation protocol (SDAP) layer of a master node and a protocol layer below an SDAP layer of a secondary node, or (2) an SDAP layer of the secondary node and a protocol layer below an SDAP layer of the master node; and
transmitting, by the access network node, the QoS flow by using the first bearer.

2. The communication method according to claim 1, wherein the access network node is a master node or a secondary node.

3. The communication method according to claim 2, wherein the protocol stack corresponding to the first bearer further supports transmission of a QoS flow through a second path, wherein
the first path passes through the SDAP layer of the master node and the protocol layer below the SDAP layer of the secondary node, and the second path is a path between the master node and the terminal device; or
the first path passes through the SDAP layer of the secondary node and the protocol layer below the SDAP layer of the master node, and the second path is a path between the secondary node and the terminal device.

4. The communication method according to claim 3, wherein the method further comprises:
sending, by the access network node to the terminal device, path indication information indicating a path transmission mode of the QoS flow, and the path transmission mode is one of (1) transmitting the QoS flow through the first path, (2) transmitting the QoS flow through the second path, or (3) transmitting the QoS flow through both the first path and the second path.

5. The communication method according to claim 4, wherein the method further comprises:
sending, by the access network node to the terminal device, path adjustment information indicating to change the path transmission mode of the QoS flow.

6. The communication method according to claim 4, wherein the path indication information is carried in one of radio resource control (RRC) layer signaling, SDAP layer signaling, or media access control (MAC) layer signaling.

7. The communication method according to claim 3, wherein the method further comprises:
sending, by the access network node to the terminal device, duplicate transmission indication information indicating to perform duplicate transmission of the QoS flow mapped to the bearer through the first path and the second path.

8. The communication method according to claim 7, wherein the method further comprises:
sending, by the access network node to the terminal device, duplicate transmission stop indication information indicating to stop duplicate transmission of the QoS flow mapped to the first bearer through the first path and the second path.

9. The communication method according to claim 1, wherein a frame header of an SDAP protocol data unit (PDU) comprised in the QoS flow comprises a serial number indicating a rank of the SDAP PDU.

10. The communication method according to claim 1, wherein the protocol layer below the SDAP layer of the master node or the secondary node comprises a packet data convergence protocol (PDCP) layer and a protocol layer below the PDCP layer.

11. A communication method, comprising:
receiving, by a terminal device, indication information indicating to transmit a quality of service (QoS) flow by using a bearer, wherein a protocol stack corresponding to the bearer supports transmission of a QoS flow through a first path, wherein the first path passes through one of (1) a service data adaptation protocol (SDAP) layer of a master node and a protocol layer below an SDAP layer of a secondary node, or (2) an SDAP layer of the secondary node and a protocol layer below an SDAP layer of the master node; and
transmitting, by the terminal device, the QoS flow by using the first bearer.

12. The communication method according to claim 11, wherein the access network node is a master node or a secondary node.

13. The communication method according to claim 12, wherein the protocol stack corresponding to the first bearer further supports transmission of a QoS flow through a second path, wherein
the first path passes through the SDAP layer of the master node and the protocol layer below the SDAP layer of the secondary node, and the second path is a path between the master node and the terminal device; or
the first path passes through the SDAP layer of the secondary node and the protocol layer below the SDAP layer of the master node, and the second path is a path between the secondary node and the terminal device.

14. The communication method according to claim 13, wherein the method further comprises:
receiving, by the terminal device, path indication information indicating a path transmission mode of the QoS flow, and the path transmission mode is one of (1) transmitting the QoS flow through the first path, (2) transmitting the QoS flow through the second path, or (3) transmitting the QoS flow through both the first path and the second path.

15. The communication method according to claim 14, wherein the method further comprises:
receiving, by the terminal device, path adjustment information indicating to change the path transmission mode of the QoS flow.

16. The communication method according to claim 14, wherein the path indication information is carried in one of: radio resource control (RRC) layer signaling, SDAP layer signaling, or media access control (MAC) layer signaling.

17. The communication method according to claim 13, wherein the method further comprises:
receiving, by the terminal device, duplicate transmission indication information indicating to perform duplicate transmission of the QoS flow mapped to the bearer through the first path and the second path.

18. The communication method according to claim 17, wherein the method further comprises:

receiving, by the terminal device, duplicate transmission stop indication information indicating to stop duplicate transmission of the QoS flow mapped to the first bearer through the first path and the second path.

19. The communication method according to claim 11, wherein a frame header of an SDAP protocol data unit (PDU) comprised in the QoS flow comprises a serial number indicating a rank of the SDAP PDU.

20. A terminal device, comprising:
at least one processor; and
a non-transitory computer-readable storage medium coupled to the at least one processor and storing programming instructions for execution by the at least one processor, the programming instructions instruct the at least one processor to perform:
receiving indication information indicating to transmit a quality of service (QoS) flow by using a bearer, wherein a protocol stack corresponding to the bearer supports transmission of a QoS flow through one of (1) a first path, wherein the first path passes through a service data adaptation protocol (SDAP) layer of a master node and a protocol layer below an SDAP layer of a secondary node, or (2) an SDAP layer of the secondary node and a protocol layer below an SDAP layer of the master node; and
transmitting the QoS flow by using the first bearer.

* * * * *